(12) United States Patent
Nakata et al.

(10) Patent No.: US 6,421,510 B2
(45) Date of Patent: Jul. 16, 2002

(54) DIGITAL IMAGE FORMING APPARATUS WITH A SADDLE STITCHING MODE

(75) Inventors: Hironobu Nakata; Hiroaki Ikeda, both of Toyokawa; Kaoru Tada, Aichi-Ken; Tomoyuki Atsumi, Toyohashi; Hiroyasu Ito, Okazaki, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/740,009

(22) Filed: Dec. 20, 2000

(30) Foreign Application Priority Data

Dec. 20, 1999 (JP) .......................................... 11-360848
Oct. 27, 2000 (JP) ...................................... 2000-328917

(51) Int. Cl.[7] .............................................. G03G 15/00
(52) U.S. Cl. .......................... 399/82; 399/382; 399/408
(58) Field of Search .......................... 399/45, 363, 370, 399/382, 82, 408, 193, 410

(56) References Cited

U.S. PATENT DOCUMENTS

| | | |
|---|---|---|
| 5,839,019 A | 11/1998 | Ito |
| 5,841,547 A | 11/1998 | Takemoto et al. |
| 5,897,251 A | 4/1999 | Kato et al. |

OTHER PUBLICATIONS

Japanese Patent Abstract, Publication No. 11–170660; Published on Jun. 29, 1999.
Japanese Patent Abstract, Publication No. 11–191838; Published on Jul. 13, 1999.

Primary Examiner—Quana M. Grainger
(74) Attorney, Agent, or Firm—Morrison & Foerster, LLP

(57) ABSTRACT

A digital image forming apparatus is equipped with image input means, image signal storage means and image forming means. The image signal storage means stores image data of a plurality of documents per page. The image forming means forms images on copy paper sheets based on the image data read from the image signal storage means. The digital image forming apparatus is also provided with a saddle stitching mode wherein the image data stored in the image signal storage means is transmitted in sequence to the image forming means so that images are formed on the copy paper sheets in a page order indicated by a page array of saddle stitching corresponding to a total page number of the documents. The digital image forming apparatus is further equipped with mode specification means which make it possible to specify a mode for the spread page that is different from that for the remaining pages. Thus, the digital image forming apparatus creates saddle stitch type prints having the spread page printed in a mode different from that of the remaining pages in easy operation with high reliability.

6 Claims, 27 Drawing Sheets

TWO FOLD

Z-SHAPE FOLD

PAPER EXPANSION

CORNER STAPLE

SIDE STAPLE

CENTER STAPLE

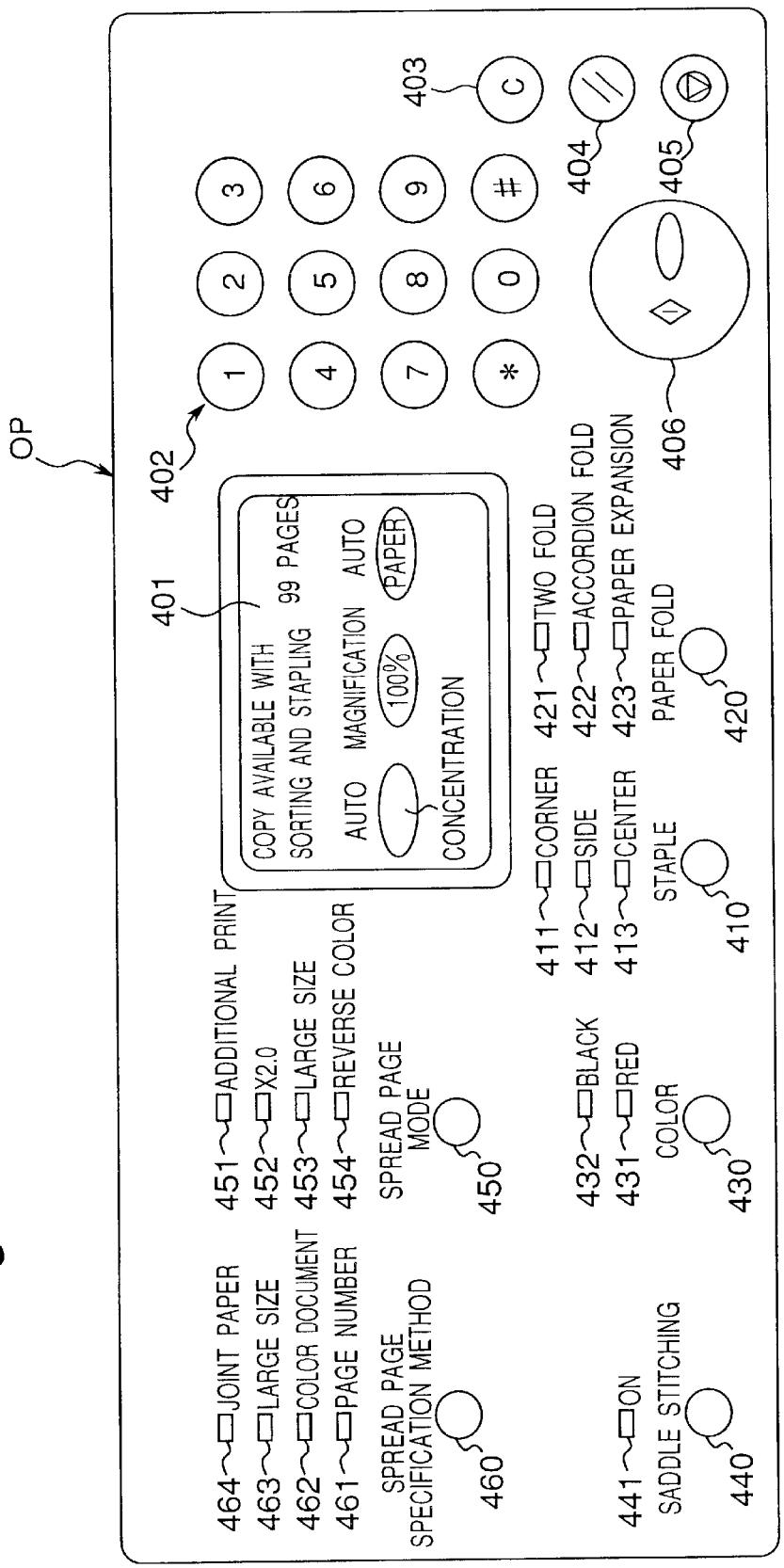

DIGITAL IMAGE FORMING APPARATUS WITH A SADDLE STITCHING MODE

This application is based on application No. 10-13656 filed in Japan, the entire content of which is hereby incorporated by reference.

BACKGROUND OF THE INVENTION

The present invention relates to a digital image forming apparatus. More particularly, the present invention relates to a digital image forming apparatus having a functionality of saddle stitching, in which a plurality of prints generated by image forming are stacked and stitched at a center of a spread page as in the case of weekly magazines.

The term "spread page" refers to the innermost sheet of saddle stitch type prints when they are gathered, and the term "saddle stitch type prints" refer to printed paper sheets that are produced for saddle stitching but not stitched yet.

A conventional copy machine having this type of saddle stitching functionality is disclosed in U.S. Pat. No. 5,897,251. With this copy machine, in order to allocate images of e.g. the third and fourth pages to a spread page of saddle stitch type prints, printing is conducted with fourth page replaced with the fifth page or with a white paper sheet inserted before the third page.

Also, the conventional copy machine is not capable of automatic creation of saddle stitch type prints having the spread page printed in a mode different from that of the remaining pages, for example, the spread page in full color and the remaining pages in monochrome. To obtain such prints with the conventional copy machine, an operator first needs to select from the documents two pages to be arranged on the front side of the spread page and another two pages to be arranged on the back side of the spread page. These four pages are then color-copied in the saddle stitching mode while the remaining pages are copied in monochrome in the saddle stitching mode. Finally, these two sets of prints are combined and bound at the center of the spread page to gather saddle stitch type prints. Thus, the saddle stitch type prints with the conventional copy machine requires an operator to carry out bothersome and complicated operations because two kinds of prints obtained by two separate copying processes should be combined.

SUMMARY OF THE INVENTION

Accordingly, it is an object of the present invention to provide a digital image forming apparatus that produces saddle stitch type prints having a spread page printed in a mode different from that of the remaining pages in easy operation with high reliability.

A first aspect of the present invention provides a digital image forming apparatus, comprising: image input means for inputting image data of a plurality of documents; image signal storage means for storing the image data inputted by the image input means per page; image forming means for forming an image on a copy paper sheet based on the image data read out from the image signal storage means; a saddle stitching mode for transmitting the image data stored in the image signal storage means in sequence to the image forming means so that images are formed, corresponding to an inputted total page number of the documents, on copy paper sheets respectively in a page order indicated by a page array for saddle stitching of the copy paper sheets; and mode specification means for specifying a mode for a spread page different from a mode for the remaining pages.

The digital image forming apparatus according to the first aspect of the present invention provides the mode specification means that make it possible to specify a mode for a spread page that is different from that for the remaining pages. An operator inputs the mode specification through the mode specification means and obtains the saddle stitch type prints with the spread page printed in a mode different from that of the remaining pages in easy operation with high reliability.

In one embodiment of the first aspect of the present invention, the mode for the spread page specified by the mode specification means is a color mode different from a color mode for the remaining pages.

The term "color mode" is used herein in a comprehensive sense to include modes in which images are formed not only with a plurality of colors such as full colors or multi-colors, but also with a single color such as a black color.

In the digital image forming apparatus of this embodiment, the mode specified by the mode specification means for the spread page is a color mode different from modes for the remaining pages. Therefore, the digital image forming apparatus produces the saddle stitch type prints having the spread page printed in a color mode different from the color mode of the remaining pages in easy operation with high reliability.

In one embodiment of the first aspect of the present invention, the mode for the spread page specified by the mode specification means is a sheet type mode different from a sheet type mode for the remaining pages.

In the digital image forming apparatus of this embodiment, the sheet type mode specified by the mode specification means for the spread page is different from the sheet type mode specified for the remaining papers. Besides, the digital image forming apparatus produces the saddle stitch type prints having the spread page printed on a paper sheet different in type from the remaining pages in easy operation with high reliability.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2A shows a print folded in two at the center thereof, FIG. 2B shows a print folded in a Z shape, and FIG. 2C shows a print expanded after folded in two for saddle stitching;

FIG. 3A shows a corner stapling for binding prints with a staple applied to a corner of the prints, FIG. 3B shows a side stapling for binding prints with two staples applied to one side of the prints, FIG. 3C shows a central stapling for binding prints with two staples applied to a crease at the centerline of the print;

FIG. 4 is a view showing an operation panel mounted on the copy machine;

DETAILED DESCRIPTION OF THE PREFERRED EMBODIMENTS

The following description discusses a preferred embodiment of the present invention with reference to the accompanying drawings.

Figure 1:
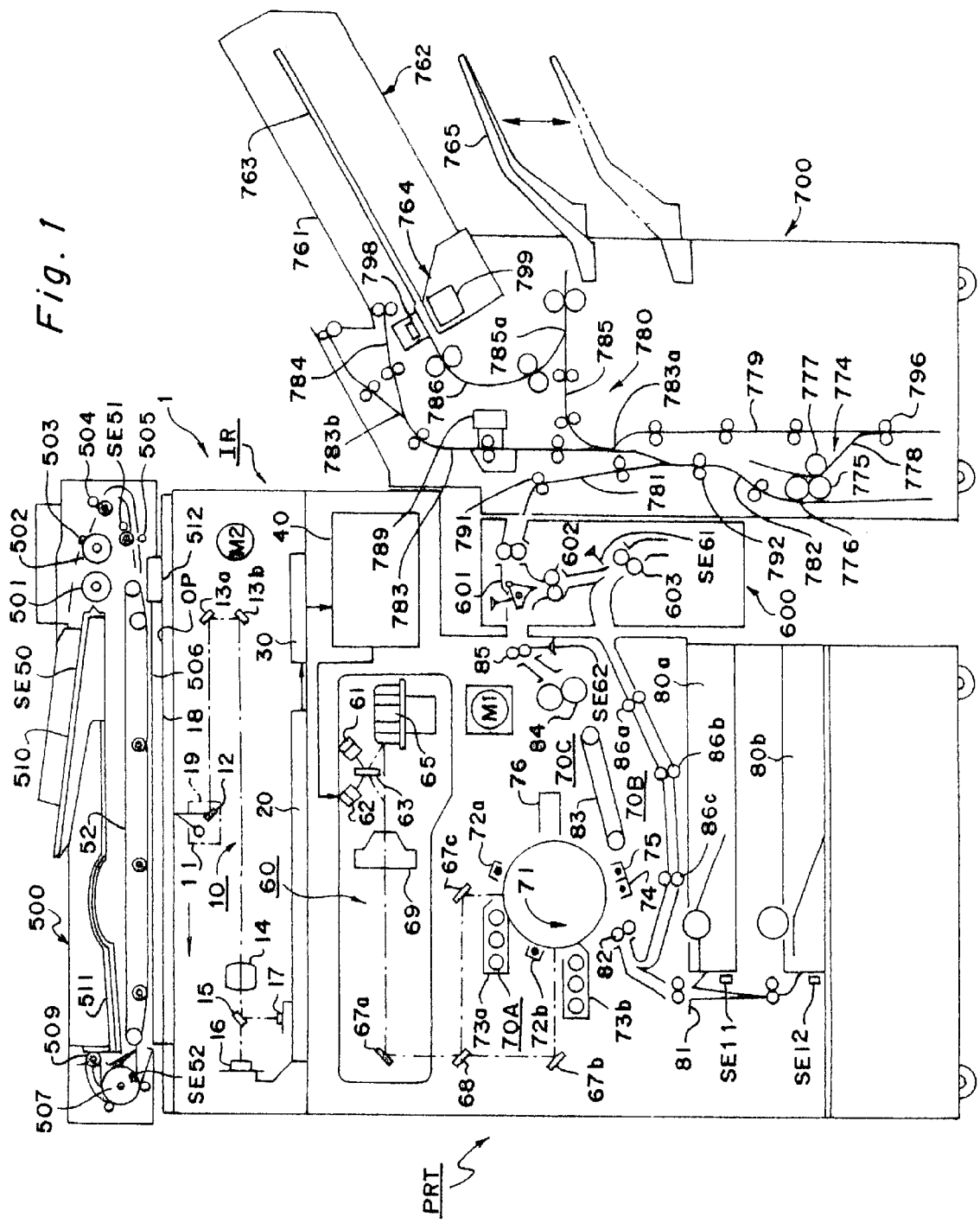
FIG. 1 is a schematic view showing an internal structure of a digital copy machine according to the present invention.

FIG. 1 illustrates an overall structure of one embodiment of a digital copy machine 1. Main components of the digital copy machine 1 include an image reader IR, a printer device PRT, and a finisher 700.

The image reader IR includes a scanning system 10 which scans documents placed on a glass tray 18, converts the same to image data and outputs the converted image data; an image signal processing unit 20 which performs quantization of photoelectric exchange signals outputted by the scanning system 10 and performs signal processing corresponding to various image forming modes; and a memory unit 30 which stores image data of documents per page. An automatic document feeder (ADFR) 500, which is an additional equipment for serving as a document cover, is mounted on an upper portion of the body of the image reader IR with the rear end thereof used as a fulcrum to permit opening and closing movement.

The scanning system 10 is a image scanning device with a line scanning system, consisting mainly of: a scanner 19 having a document illuminating lamp 11 and a mirror 12; fixed mirrors 13a and 13b; a light-concentrating lens 14; a dichroic mirror 15; image sensors 16 and 17 composed of CCD arrays; and a scan motor M2 for driving the scanner 19. The image signal processing unit 20 processes image signals outputted from the image sensors 16 and 17, and identifies black-oriented images and red-oriented images to output color image data to the memory unit 30. Detailed description of the memory unit 30 will be described later.

ADFR 500 feeds documents placed on a document stacker 510 to the glass tray 18 via a paper feed roller 501, a sort roller 502, a sort pad 503, a mid roller 504, a resist roller 505, and a transport belt 506. ADFR 500 also discharges the documents after scanning to a document discharge tray 511 via a discharge roller 509. ADFR 500 is equipped with a document scale 512, a document sensor SE50 for detecting presence of a document i.e. a sheet of paper, a document size sensor SE51, and an output sensor SE52.

When copying a plurality of pages of documents, for example, an operator set the documents so as for the documents to be stacked on the document stacker 510 with one side surfaces of the documents upward. The documents on the document stacker 510 are picked up one by one from a lowermost sheet of the documents, and arranged precisely in a scanning position on the glass tray 18 with the one side surfaces thereof downward. In the case of a single-side copy mode, each sheet of the documents, after scanning, is forwarded to the left side in FIG. 1 and discharged with the one side surface thereof upward. In the case of a two-sided copy mode, each sheet of the documents forwarded to the left side after scanning is reversed and returned to the scanning position on the glass tray 18 for scanning the other side surface thereof. After scanning the other side surface of each sheet, the sheet is again forwarded to the left side and discharged.

The printer device PRT includes a print processing unit 40, a print head 60 having semiconductor lasers 61 and 62 as light sources, and an image forming system 70, so as to print a copied image generated based on image data transferred from the image reader IR with electrophotography process.

Particularly, the image forming system 70 is composed of: a development transfer system 70A consisting of a photoreceptor drum 71 and peripheral equipment thereof; a circulating paper feed system 70B including a paper re-feed unit 600; and a fixing and discharge system 70C having a fixing roller pair 84, discharge rollers 85 and so on.

In the lower section of the printer device PRT, there are installed two paper feed cassettes 80a and 80b which accommodate several hundreds sheets of paper, document size sensors SE11 and SE12, and a transport roller group 81. Paper is supplied one sheet by another from the paper feed cassettes 80a or 80b serving as a paper feed inlet. Supplied paper sheet is then temporarily stopped by transport rollers 81 in a position of timing rollers 82. Then the paper sheet is synchronized with formation of toner image on the photoreceptor drum 71 and forwarded to a transfer position (copy position) between the photoreceptor drum 71 and a transfer charger 74.

A laser beam transmitted from the semiconductor lasers 61 and 62 enters a polygon mirror 65 via a dichroic mirror 63 and deflects from the polygon mirror 65 to the main scanning direction. The laser beam then travels through a main lens 69 and other various kinds of mirrors 67a, 68, 67b, and 67c, and reaches an exposure position in the photoreceptor drum 71.

The surface of the photoreceptor drum 71 is uniformly electrified by electrification chargers 72a and 72b. A latent image formed by exposure is sent through developing devices 73a and 73b to make a red and/or black toner image, which is then transferred to the paper sheet by the transfer charger 74 at a transfer position. The paper sheet to which the toner image is transferred is separated from the photoreceptor drum 71 by a separate charger 75, sent to the fixing roller pair 84 by the transport belt 83, and discharged from the printer device by the discharge rollers 85.

The paper re-feed unit 600 is installed on the side of the printer device PRT as an additional device to automate a two-sided copy process. The paper re-feed unit 600 temporarily accommodates a paper sheet discharged from the printer device by the discharge rollers 85, and returns the paper sheet to the printer device with a switch-back transport function.

In the single-sided copy mode, a paper sheet is forwarded to the finisher 700 without stopping in the paper re-feed unit 600. In the two-sided copy mode, on the other hand, a left end of a switching pawl 601 is shifted upward by a solenoid not illustrated, and a paper sheet supplied from the discharge rollers 85 is guided by the switching pawl 61 to transport rollers 602 and further sent to opposite rollers 603. When the rear end of the paper sheet reaches the paper sensor SE61, the opposite rollers 603 is reversed, which returns the paper sheet to the printer device. Returned paper sheet then travels through horizontal transport rollers 86a, 86b, and 86c, and reaches the timing rollers 82 to stand by.

The finisher 700 is composed of: a non-sort tray 61 which accommodates paper sheets (hereinafter referred to as "print (s)") forwarded from the paper re-feed unit 600; a staple processing unit 762 which binds the prints forwarded from a tray 763 after accumulated with a stapler 764; a large capacity accommodation tray 765 movable in upper and lower directions; a paper folding unit 774; and a print transport unit 780.

The print transport unit 780 includes: a transport path 781 for downwardly transporting the prints forwarded from the paper re-feed unit 600 and received by rollers 791; a switch-back transport path 782 for switching back the prints with the rollers 791 and transporting the same in the upward direction; a transport path 783 for transporting the switched back prints to the non-sort tray 61; a transport path 784 for forwarding the prints come from a turning point 783b on the transport path 783 to the staple processing tray 763; a transport path 785 for forwarding the prints come from a turning point 783a on the transport path 783 to the large capacity accommodation tray 765; and a transport path 786 for transporting a print bundle bound with the stapler 764 to a junction 785a on the transport path 785. The transport path 783 incorporates a punching unit 789.

Figure 2A:
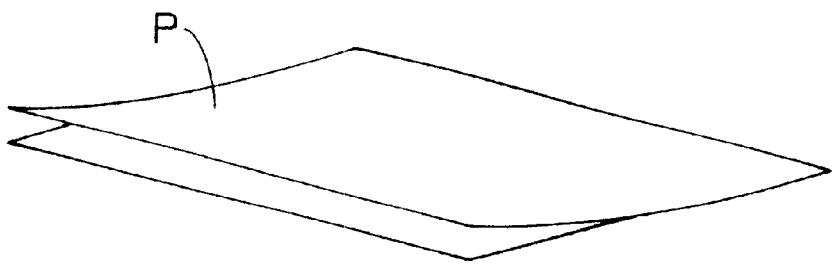
FIGS. 2A, 2B and 2C are views illustrating paper foldings, where
Figure 2B:
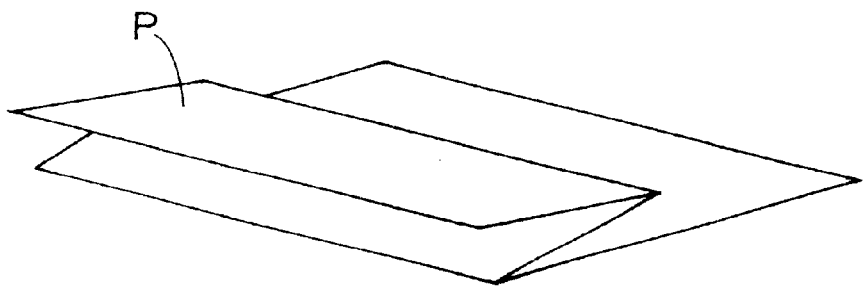
Figure 2C:
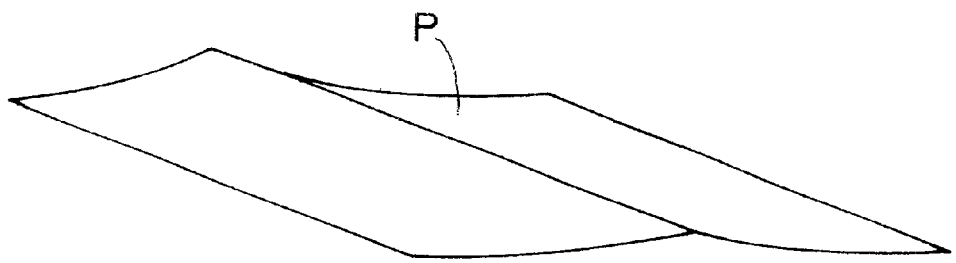

The paper folding unit 774 is equipped with three paper folding rollers 775, 776, and 777. The paper folding unit 774 provides a two fold mode for folding a print P in two at the centerline thereof as shown in FIG. 2A, an Z-shape fold mode for folding the print P in an Z shape as shown in FIG. 2B, and a paper expansion mode for expanding the print P as shown in FIG. 2C for saddle stitching after the print P is folded in two. Such paper folding processing with three paper folding rollers 775, 776, and 777 is already known and therefore a detailed description thereof is omitted. Folded Prints are then delivered from a transport path 787 to a transport path 779 downwardly, switched back by rollers 796 and directed to the transport path 779 upwardly, and further directed to the turning point 783a on the transport path 783.

Figure 3A:
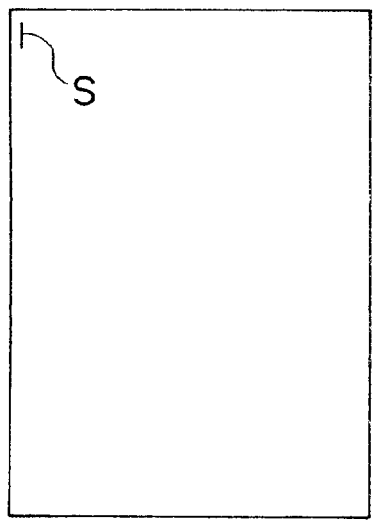
FIGS. 3A, 3B, and 3C are views illustrating staplings, where
Figure 3B:
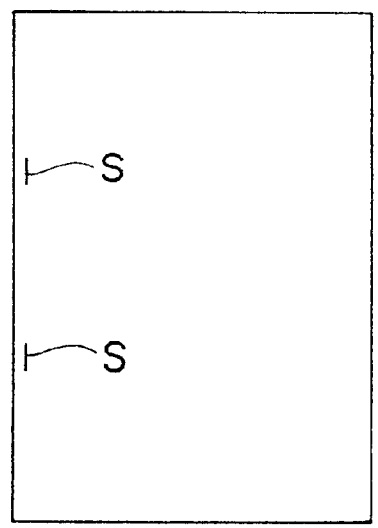
Figure 3C:
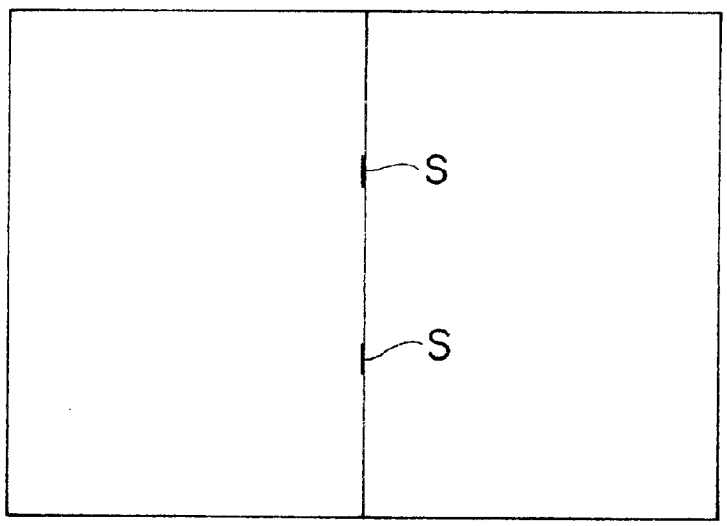

The staple processing unit 762 shown in FIG. 1 is equipped with a head unit 799 for striking staples into a print bundle, and a head unit 798 for incurving both legs of the staples struck into the print bundle. The units 798 and 799 provide horizontal movement in a direction vertical to the paper sheet shown in FIG. 1 by driving means not illustrated. The staple processing unit 762 provides the print bundle accumulated on the tray 763 with a corner staple mode for applying a staple S to a corner of the print bundle as shown in FIG. 3A, a side staple mode for applying two staples S to one side of the print bundle as shown in FIG. 3B, and a center staple mode for applying two staples S to a grease at the centerline of the print bundle. Such stapling methods are already known and therefore a detailed description thereof is omitted herein.

FIG. 4 indicates an operation panel OP set on the printer device PRT. On the operating panel OP, there are mounted: a liquid crystal touch panel 401; a ten key 402 for inputting number of copies and scale magnification; a clear key 403 for resetting data inputted with the ten key 402; a reset key 404 for resetting various copy modes to the initial setting; a start key 406 for staring a copying operation; and a stop key 405 for stopping the copying operation. On the operating panel OP, there are further mounted: a staple mode selection key 410 for allowing an operator to specify various copy modes; a paper folding mode selection key 420; a color mode selection key 430; a saddle stitching mode selection key 440; a spread mode key 450; and a spread page selection key 460. In vicinity of the keys 410, 420, 430, 440, 450, and 460, there are respectively provided light emitting diodes (LEDs) 411 to 413, 421 to 423, 431 to 432, 441, 451 to 454, 461 to 464 for displaying the mode selection states of each key. Methods of specifying various copy modes will be described in detail later.

Figure 5:
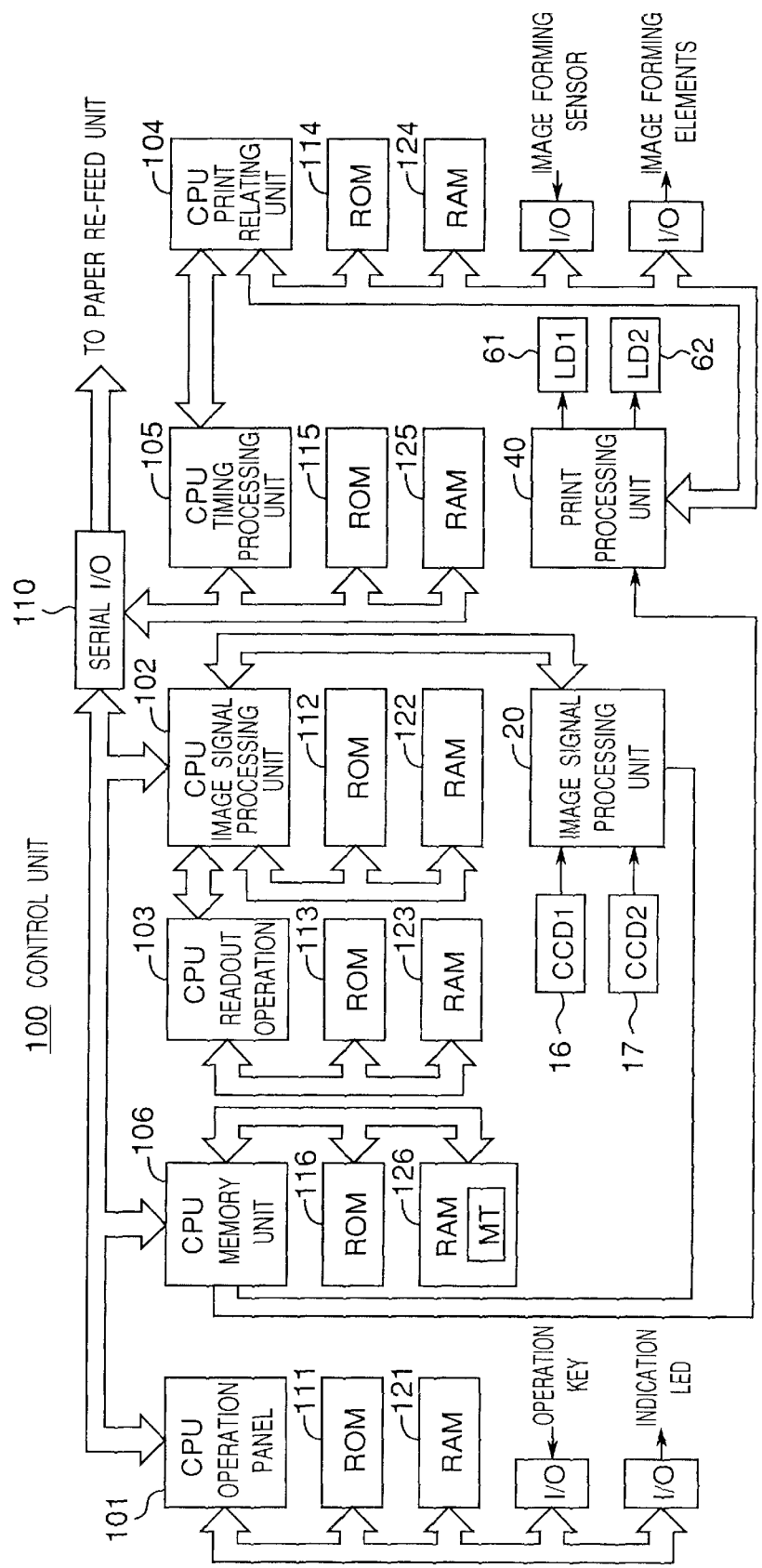
FIG. 5 is a view showing a structure of a control unit of the copy machine.

FIG. 5 illustrates a block diagram of a control unit 100 in the copy machine 1. The control unit 100 has central processing units (CPUs) 101 to 106 connected thereto via a serial input/output interface (I/O) 110. The CPUs 101 to 106 incorporate read-only memories (ROMs) 111 to 116 for accommodating programs and random access memories (RAMs) 121 to 126 serving as working areas of temporal data storage, respectively. The CPU 106 is incorporated in the memory unit 30.

The CPU 101 controls various input keys on the operation panel, input signals from various sensors, and display output to a display unit on the operation panel OP. The operation panel OP allows an operator to perform the saddle stitching mode specification and other specifications relating to a spread page in connection with the saddle stitching mode. The spread page refers to the innermost sheet in gathering saddle stitch type prints. In this embodiment, the "spread page" is formed in the middle sheet of the saddle stitch type prints when they are gathered.

The CPU 102 controls each section of the image signal processing unit 20 and also determines a color of each document based on color data outputted from the image signal processing unit 20.

The CPU 103 controls drive of the scanning system 10, and determines size of each document and also determines whether or not each document is a joint paper based on output of the document size sensor SE51.

The CPU 104 controls the printer device PRT including the print processing unit 40.

The CPU 105 implements overall timing adjustment of the control unit 100 and processing for operation mode setting. Accordingly, the CPU 105 sends and receives commands and reports necessary for control through serial communications with other CPUs.

The CPU 106 implements read and write of image data in the memory unit 30 and controls image compression and expansion involved therewith.

Figure 6:
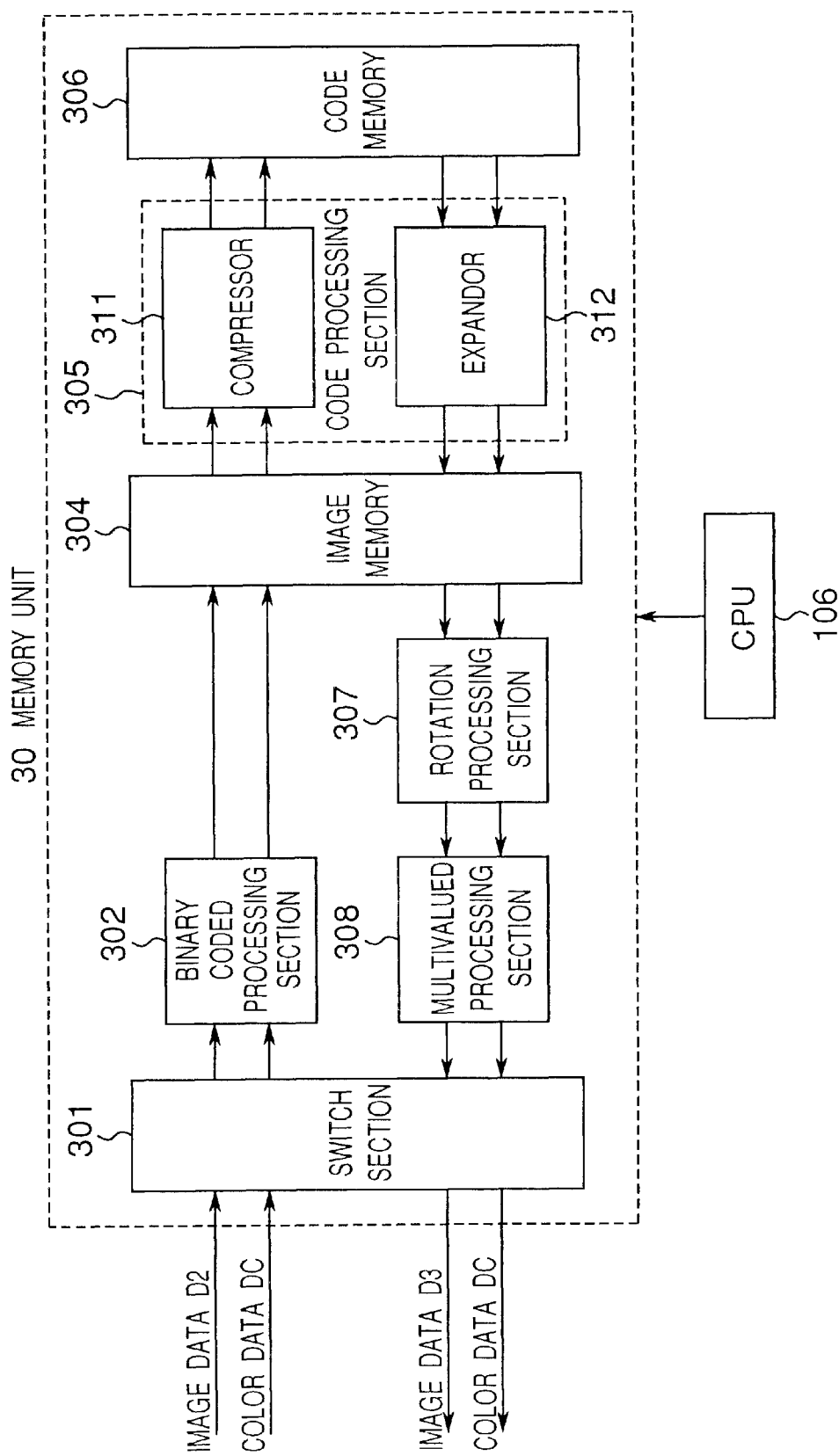
FIG. 6 is a view showing a structure of a memory unit of the copy machine.

FIG. 6 refers to a block diagram of the memory unit 30. The memory unit 30 incorporates: a switch section 301 for switching read and write of image data; a binary coded processing section 302 for generating binary data based on parameters sent from the CPU 106; a multiport image memory 304 having a capacity of one page in A3 size with 400 dpi; a code processing section 305 having separately movable compressor 311 and expandor 312; a multiport code memory 306 having a plurality of memory regions of 32K byte unit; a rotation processing section 307 for rotating output image data; and a multivalued processing section 308 for generating multivalued data based on parameters from the CPU 106.

Image data D2 inputted through the switch section 301 is converted to binary data by the binary coded processing section 302, and written to a region in the image memory 304 designated by the CPU 106. When the image data D2 is written to the image memory 304, the CPU 106 reads the image data from the memory 304 and compresses read image data with the compressor 311 in the code processing section 305 to create coded data. At the same time, the CPU 106 creates a memory management table MT within the RAM 126, accordingly to which the CPU 106 stores the coded data in the code memory 306. The memory management table MT stores information such as the number to identify each memory region in the code memory 306 and the page number of documents. In the case that a document page is divided into a plurality of regions, a number corresponding to each concatenated region is also stored in the memory management table MT. In addition, various additional information required for data compression and expansion, such as a compression method and a data length, are also stored in the memory management table MT.

Conversely, when outputting image data, the CPU 106 reads out coded data from the code memory 306, and expands the coded data with the expandor 312 in the code processing section 305. The expanded data is written onto a region in the image memory 304 designated by the CPU 106. For implementing page composition, in which a plurality of images are outputted as image data of one page in the saddle stitching mode, image data of other pages is additionally written onto a region in the image memory 304 designated by the CPU 106 to create the image data for one page to be outputted as a composite page. Upon creation of the image data for the composite page in the image memory 304, the image data is subject to rotation processing in the rotation processing section 307 as needed, and converted to multivalued image data in the multivalued processing section 308. The multivalued image data is then outputted as image data D3 via the switch section 301. Information stored in the memory management table MT is cleared when corresponding image data is all normally outputted for a necessary number of copies.

Figure 7:
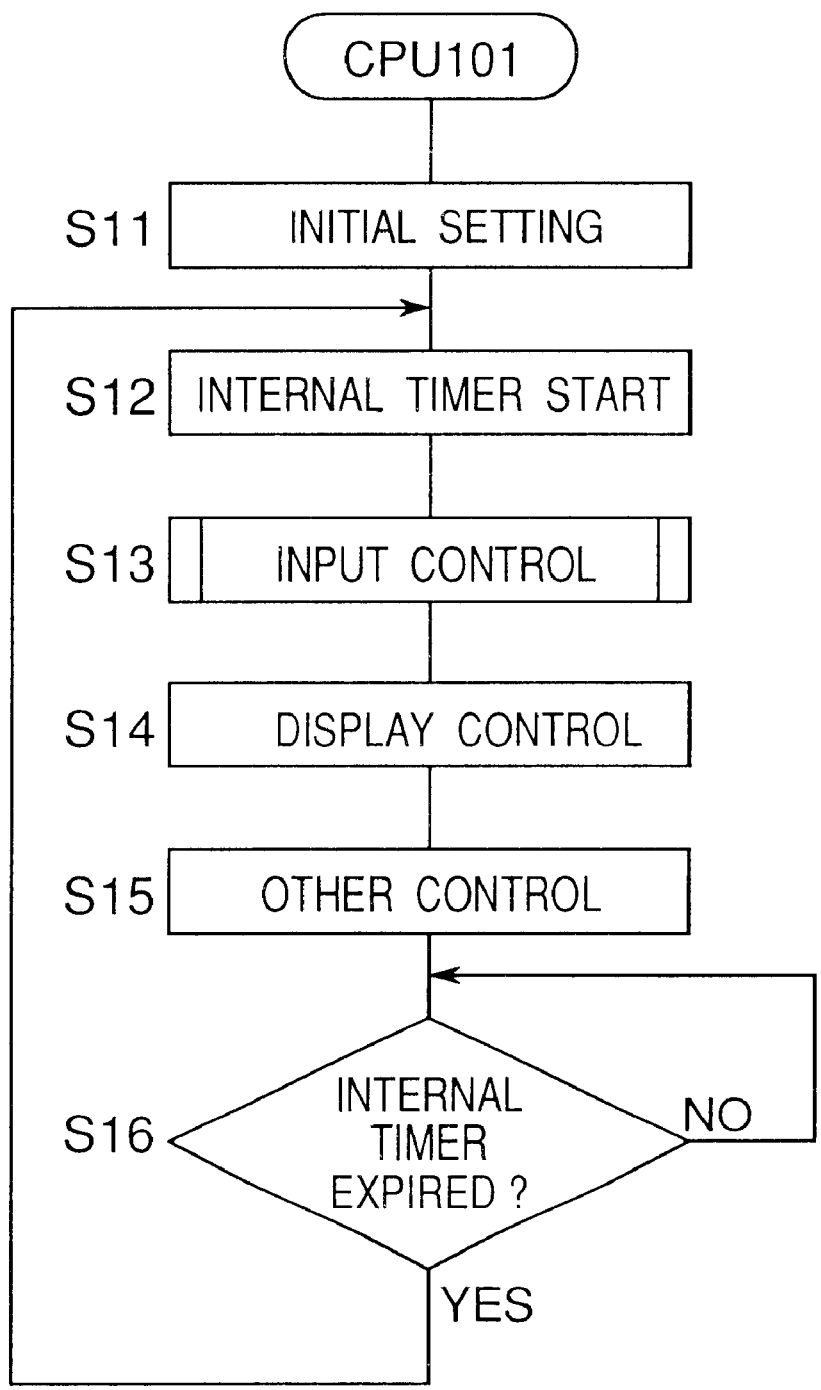
FIG. 7 shows a flow chart of a main routine executed by CPU 101 in the control unit.

FIG. 7 refers to a flow of the main routine executed in the CPU 101. First of all, initial setting is executed (S11), and an internal timer is set and started to make processing time of one routine constant (S12). Next, control processing of input signals from various switches on the operation panel OP and from various sensors inside the copy machine (S13), display control processing of the liquid crystal display panel and display elements on the operation panel OP (S14), and control processing of other internal mechanisms (S15) are executed. After confirmation of the expiration of the internal timer (S16), the procedure returns to the step S12. Communications with the CPUs 102 to 106 are executed by interruption.

Figure 8:
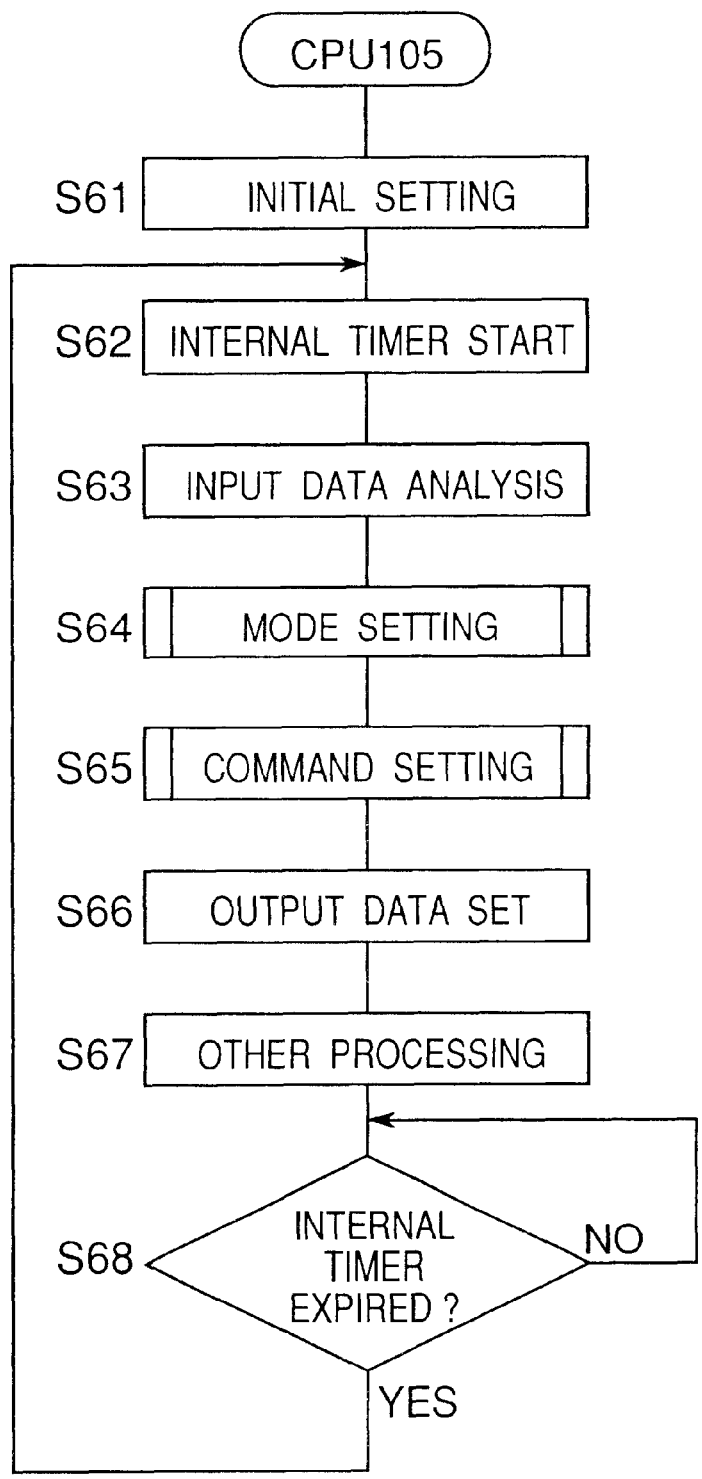
FIG. 8 shows a flow chart of a main routine executed by CPU 105 in the control unit.

FIG. 8 refers to a flow of the main routine executed in the CPU 105. At first, initial setting is executed (S61), and then the internal timer is started (S62). Various data inputted by interrupts is analyzed (S63), and if there is any change in an operation mode, mode setting is executed (S64). Next, Command setting is performed for controlling write and read access to/from the image memory corresponding to a specified copy mode (S65). Then, data to be outputted in interrupts is set (S66), and other processing is carried out (S67). After confirmation of expiration of the internal timer (S68), the procedure returns to the step S62.

Figure 9:
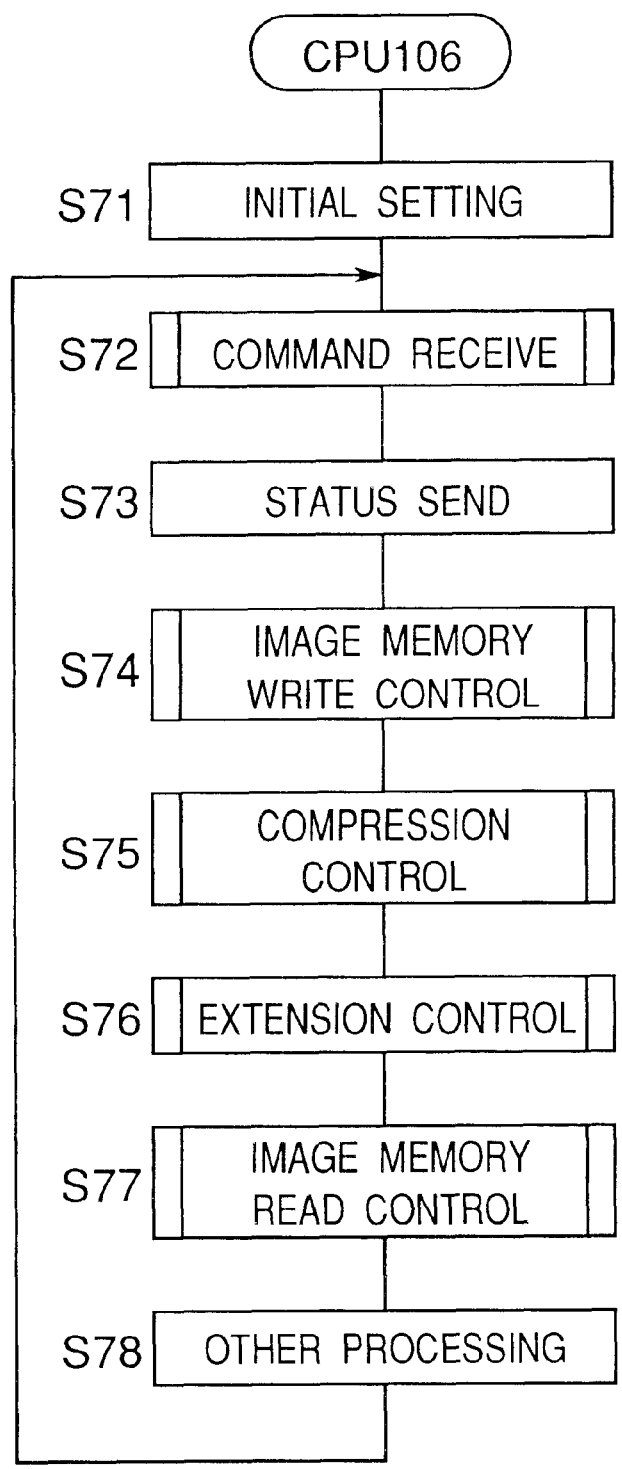
FIG. 9 shows a flow chart of a main routine executed by CPU 106 in the control unit.

FIG. 9 refers to a flow of the main routine executed in the CPU 106. First, initial setting is executed (S71), reception of commands from other CPUs (S72) and transmission of statuses (S73) are conducted. Further, control of write access to the image memory (S74), compression control (S75), extension control (S76), and control of read access from the image memory (S77) are performed. Finally, other processing is executed (S78) and the procedure returns to the step S72.

Figure 10:
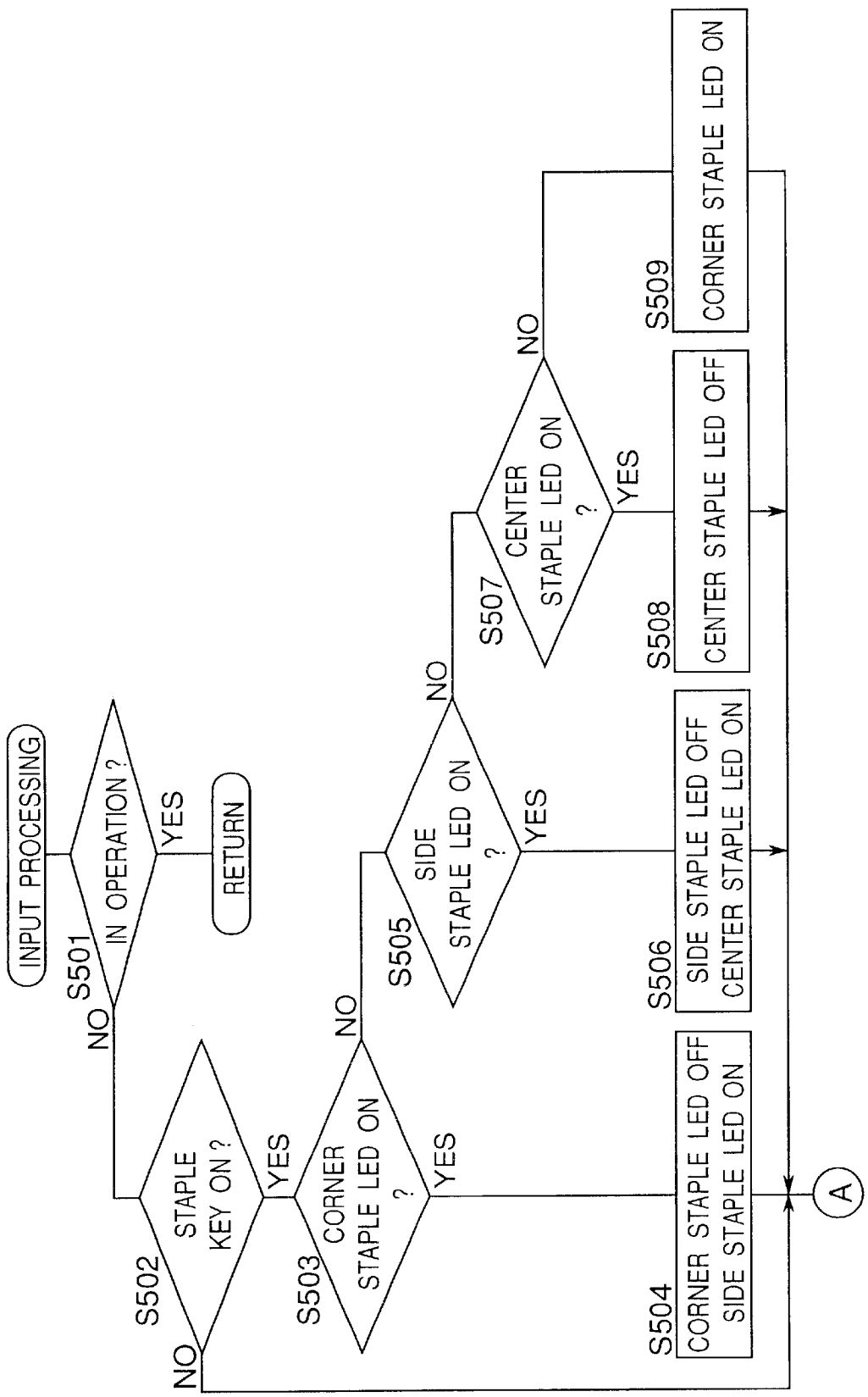
FIG. 10 shows a first section of a flow of input operation executed by CPU 101 in response to operator's input to the operation panel to specify various copy modes.
Figure 11:
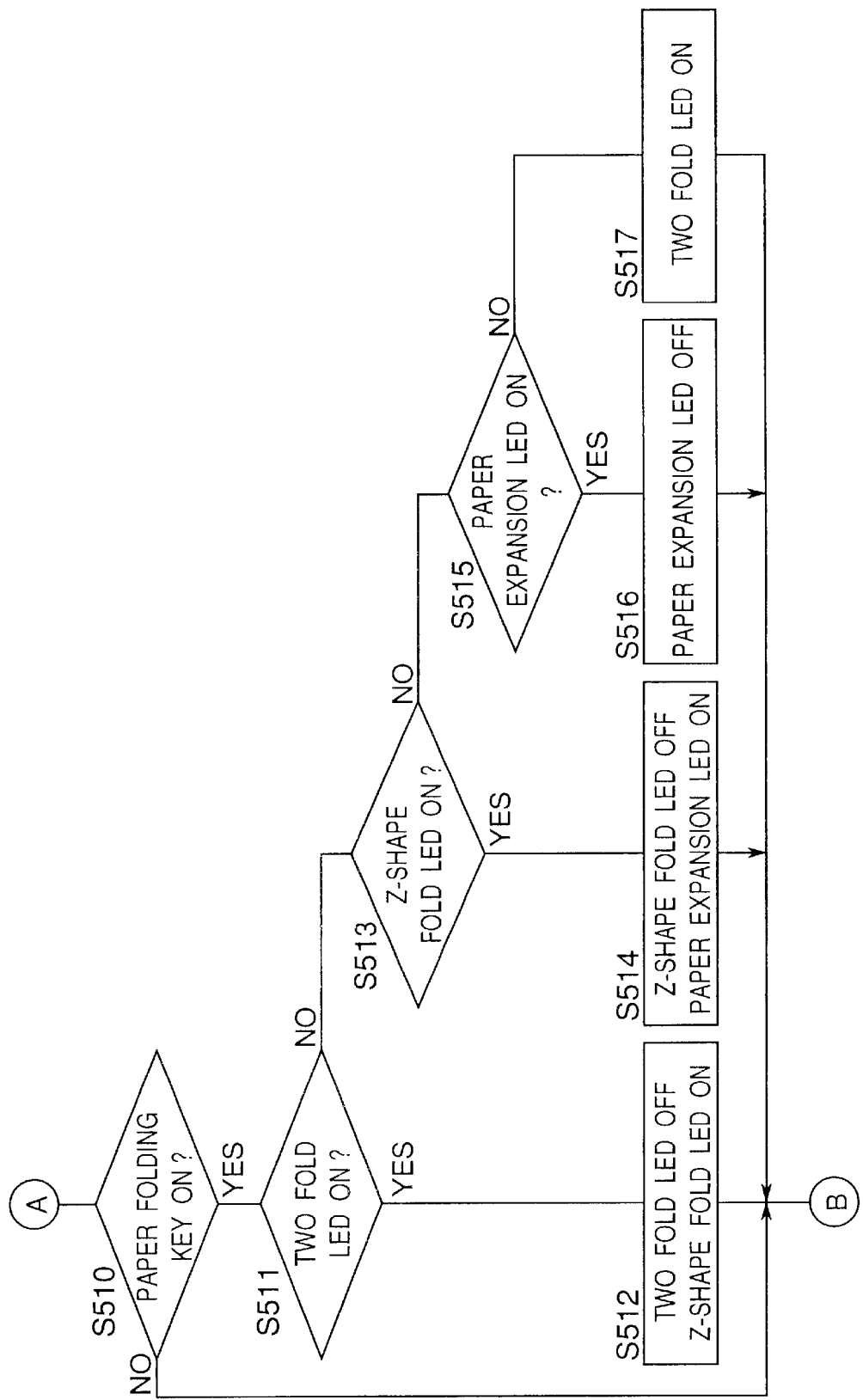
FIG. 11 shows a second section of the flow of input operation executed by CPU 101 in response to operator's input to the operation panel to specify various copy modes.
Figure 12:
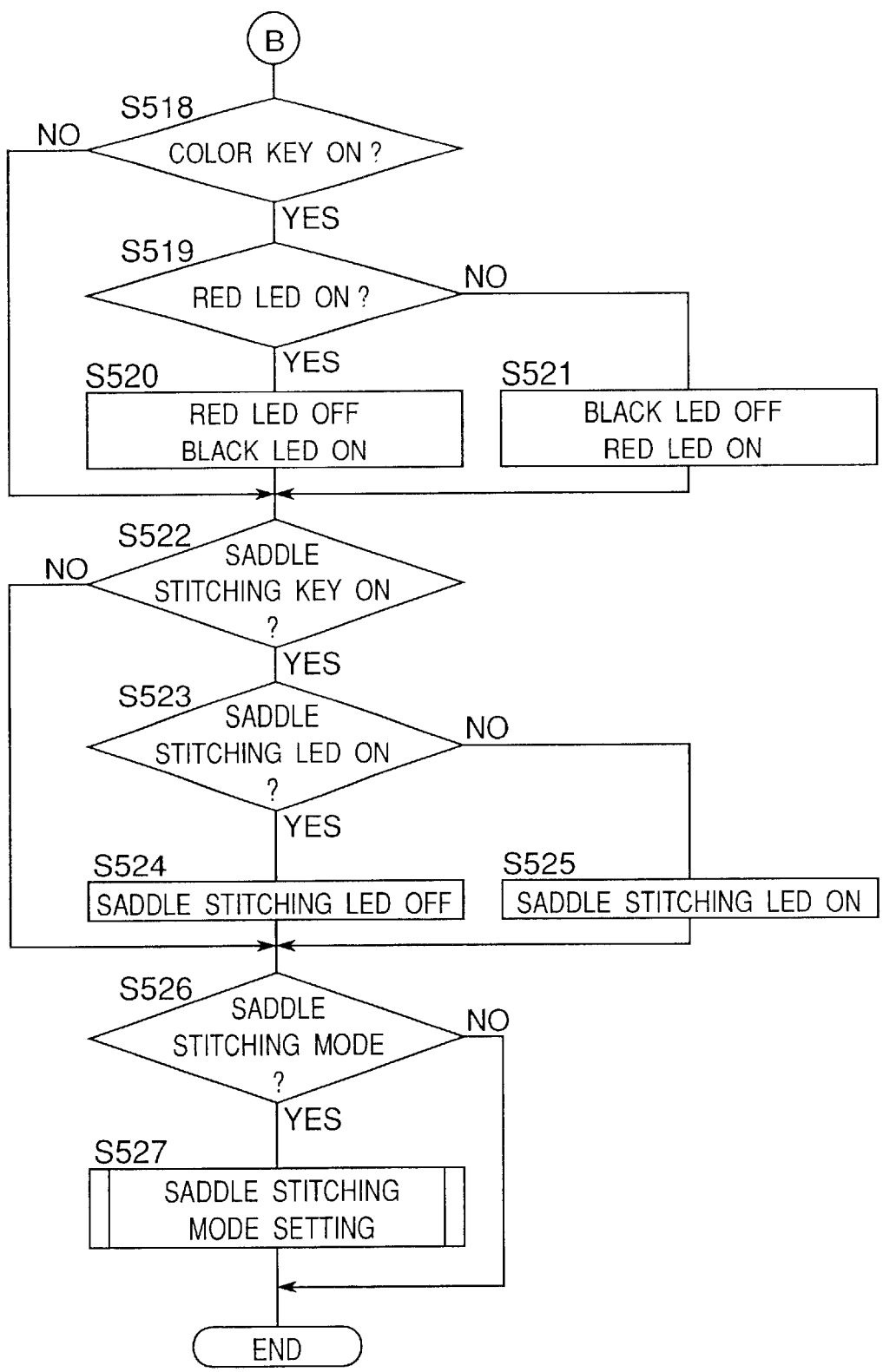
FIG. 12 shows a third section of the flow of input operation executed by CPU 101 in response to operator's input to the operation panel to specify various copy modes.

FIGS. 10 to 12 describe flows of input processing executed in the CPU 101 corresponding to the input operation by an operator on the operation panel OP (see FIG. 4) to specify various copy modes.

As shown in FIG. 10, it is determined whether copying operation is in progress or not (S501), and if not in progress, the staple mode will be set up as described hereinafter. Once the staple mode selection key 410 is turned on (S502), it is determined whether the corner staple LED 411 is turned on or not, that is, whether the corner staple mode is currently specified or not (S503) If the corner staple mode is specified, the corner staple LED 411 is turned off and the side staple mode is specified together with which the corresponding LED 412 is turned on (S504). If the corner staple mode is not specified in the step S503, it is then determined whether the side staple LED 412 is turned on or not, that is, whether the side staple mode is currently specified or not (S505). If the side staple mode is specified, the side staple LED 412 is turned off and the center staple mode is specified together with which the corresponding LED 413 is turned on (S506). If the side staple mode is not specified in the step S505, it is then determined whether the center staple LED 413 is turned on or not, that is, whether the center staple mode is currently specified or not (S507). If the center staple mode is specified, the center staple LED 413 is turned off and the staple mode setting is canceled (S508). If the center staple mode is not specified in the step S507, the corner staple mode is specified together with which the corresponding LED 411 is turned on (S509).

Whenever an operator turns on the staple mode selection key 410, the procedures from S502 to S509 are executed. As a results, every time the staple mode selection key 410 is turned on, the corner staple mode, side staple mode, the center staple mode, and cancellation of the staple mode setting are specified by turns.

Next, the paper folding mode setting will be descried with reference to FIG. 11. Once the paper folding mode selection key 420 is turned on (S510), it is determined whether the two fold LED 421 is turned on or not, that is, whether the two fold mode is currently specified or not (S511). If the two fold mode is specified, the two fold LED 421 is turned off and the Z-shape fold mode is specified together with which the corresponding LED 422 is turned on (S512). If the two fold mode is not specified in the step S511, it is then determined whether the Z-shape fold LED 422 is turned on or not, that is, whether the Z-shape fold mode is currently specified or not (S513). If the Z-shape mode is specified, the Z-shape fold LED 422 is turned off and the paper expansion mode is specified together with which the corresponding LED 423 is turned on (S514). If the Z-shape fold mode is not specified in the step S513, it is then determined whether the paper expansion LED 423 is turned on or not, that is, whether the paper expansion mode is currently specified or not (S515). If the paper expansion mode is specified, the paper expansion LED 423 is turned off and the paper folding mode is cancelled (S516). If the paper expansion mode is not specified in the step S515, the tow fold mode is specified together with which the corresponding LED 421 is turned on (S517).

Whenever the paper folding mode selection key 420 is turned on, the procedures from S510 to S517 are executed. As a result, every time the paper folding mode selection key 420 is turned on, the two fold mode, Z-shape fold mode, the paper expansion mode, and cancellation of the paper folding mode are specified by turns. Though not illustrated, the paper expansion mode will be automatically specified when the center staple mode is selected.

Color mode setting is performed as shown in FIG. 12. Once the color mode selection key 430 is turned on (S518), first it is determined whether the red mode LED 431 is turned on or not, that is, whether the red mode is currently specified or not (S519). If the red mode is specified, the red mode LED 431 is turned off and the black mode is specified together with which the corresponding black mode LED 432 is turned on (S520). If the red mode is not specified in the step S519, the black mode LED 432 is turned off and the red mode is specified together with which the corresponding red mode LED 431 is turned on (S521).

Whenever the color mode selection key 431 is turned on, the procedures from S518 to S521 are executed. As a result, every time the color mode selection key 431 is turned on, the black mode and red mode are specified by turns.

Next, it is determined whether the saddle stitching mode selection key 440 is turned on or not (S522). If the saddle stitching mode selection key 440 is turned on, it is then determined whether the saddle stitching LED 441 is turned on or not, that is, whether the saddle stitching mode is specified or not (S523). If the saddle stitching mode is specified, the saddle stitching LED 441 is turned off and the saddle stitching mode is cleared (S524). If the saddle stitching mode is not specified ("NO" in S523), the saddle stitching LED 441 is turned on and the saddle stitching mode is specified (S525).

Then, it is determined whether the saddle stitching mode is specified or not (S526). If the saddle stitching mode is specified, the saddle stitching mode setting process (S527) is executed.

FIGS. 13 to 16 indicate a detailed flow of the saddle stitching mode setting (S527 in FIG. 12). Briefly speaking, in the saddle stitching mode setting, a method for specifying the document image page to be arranged on the spread page is selected, and then a print mode of the spread page is selected.

Figure 13:
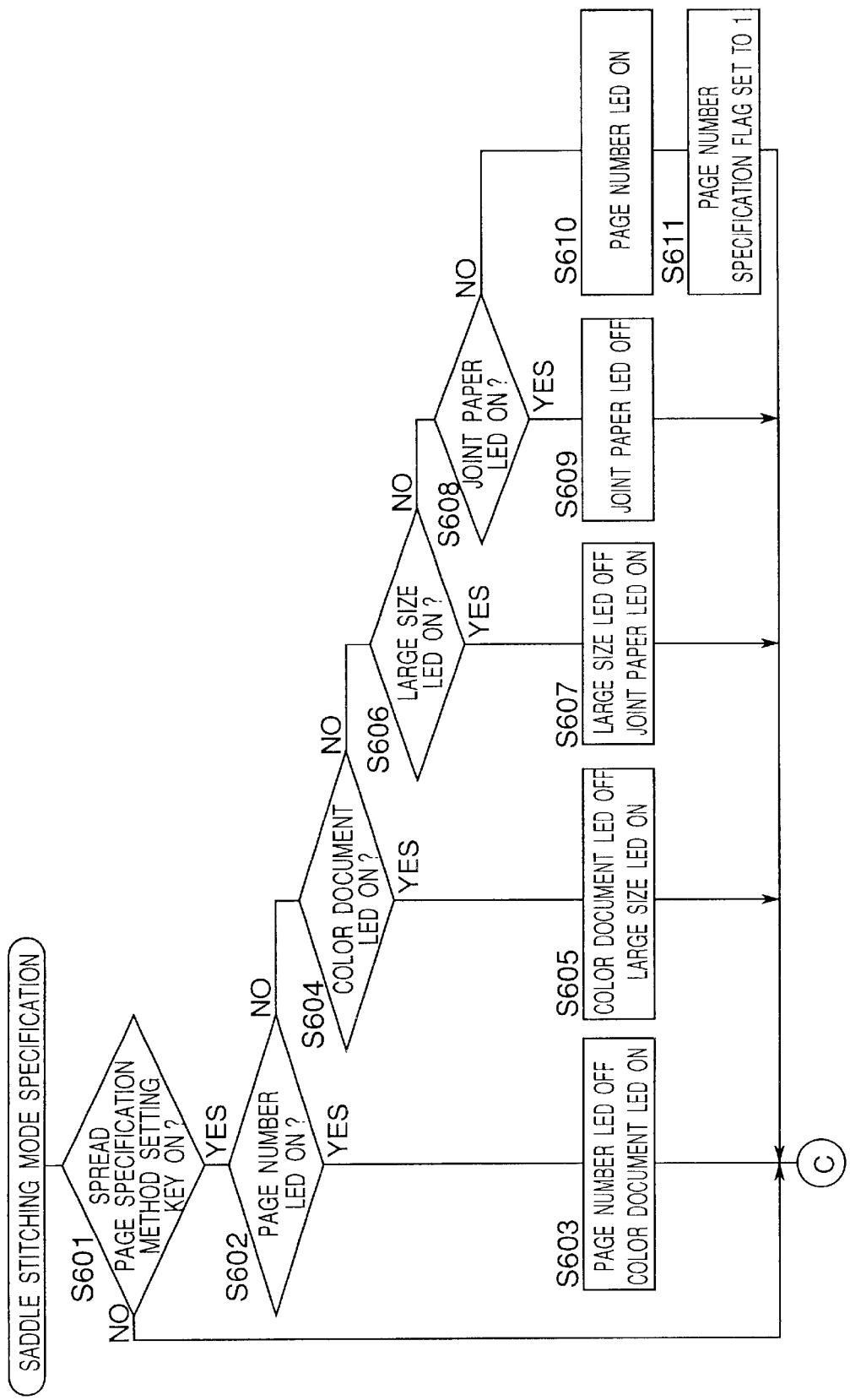
FIG. 13 shows a first section of a detailed flow of saddle stitching mode setting shown in S527 of FIG. 12.

The method for specifying the image page to be arranged on the spread page is selected as shown in FIG. 13. Corresponding to the LEDs 461 to 464 adjacent to the spread page specification method key 460 shown in FIG. 4, four modes are provided for specifying the document image page: a "page number" specification mode to specify the document image page to be deposed on the spread page by a page number; a spread page "color document" specification mode to arrange the document image including colors except monochrome on the spread page; a spread page "large size" document specification mode to arrange a larger document than the remaining documents on the spread page; and a spread page "joint paper" specification mode to arrange an image of a document next to a joint paper on the spread page when the joint paper is included in a plurality of documents. Only when the saddle stitching mode is specified, that is, when the saddle stitching LED 441 is turned on, the spread page specification method key 460 is operable.

As shown in FIG. 13, once the spread page specification method key 460 is turned on (S601), it is determined whether the page number specification LED 461 is turned on or not, that is, whether the page number specification mode is currently specified or not (S602) If the page number specification mode is specified, the page number specification LED 461 is turned off and the spread page color document specification mode is specified together with which the corresponding LED 462 is turned on (S603). If the page number specification mode is not specified in the step S602, it is then determined whether the LED 462 is turned on or not, that is, whether the spread page color document specification mode is currently specified or not (S604). If the spread page color document specification mode is specified, the LED 462 is turned off and the spread page large size document specification mode is specified together with which the corresponding LED 463 is turned on (S605). If the spread page color document specification mode is not specified in the step S604, it is then determined whether the LED 463 is turned on or not, that is, whether the spread page large size document specification mode is currently specified or not (S606). If the spread page large size document specification mode is specified, the LED 463 is turned off and the spread page join paper document specification mode is specified together with which the corresponding LED 464 is turned on (S607). If the spread page large size document specification mode is not specified in the step S606, it is then determined whether the LED 464 is turned on or not, that is, whether the spread page join paper document specification mode is currently specified or not (S608). If the spread page join paper document specification mode is specified, the LED 464 is turned off and the spread page specification mode setting is canceled (S609). If the spread page join paper document specification mode is not specified in the step S608, the page number specification mode is specified together with which the corresponding LED 461 is turned on (S610), and a page number specification flag is set to 1 (S611).

Whenever the spread page specification method key 460 is turned on, the procedures from S601 to S611 are executed. As a result, every time the spread page specification method key 460 is turned on, the page number specification mode, the spread page color document specification mode, the spread page large size document specification mode, the spread page joint paper document specification mode, and cancellation of the spread page specification mode setting are specified by turns.

Figure 14:
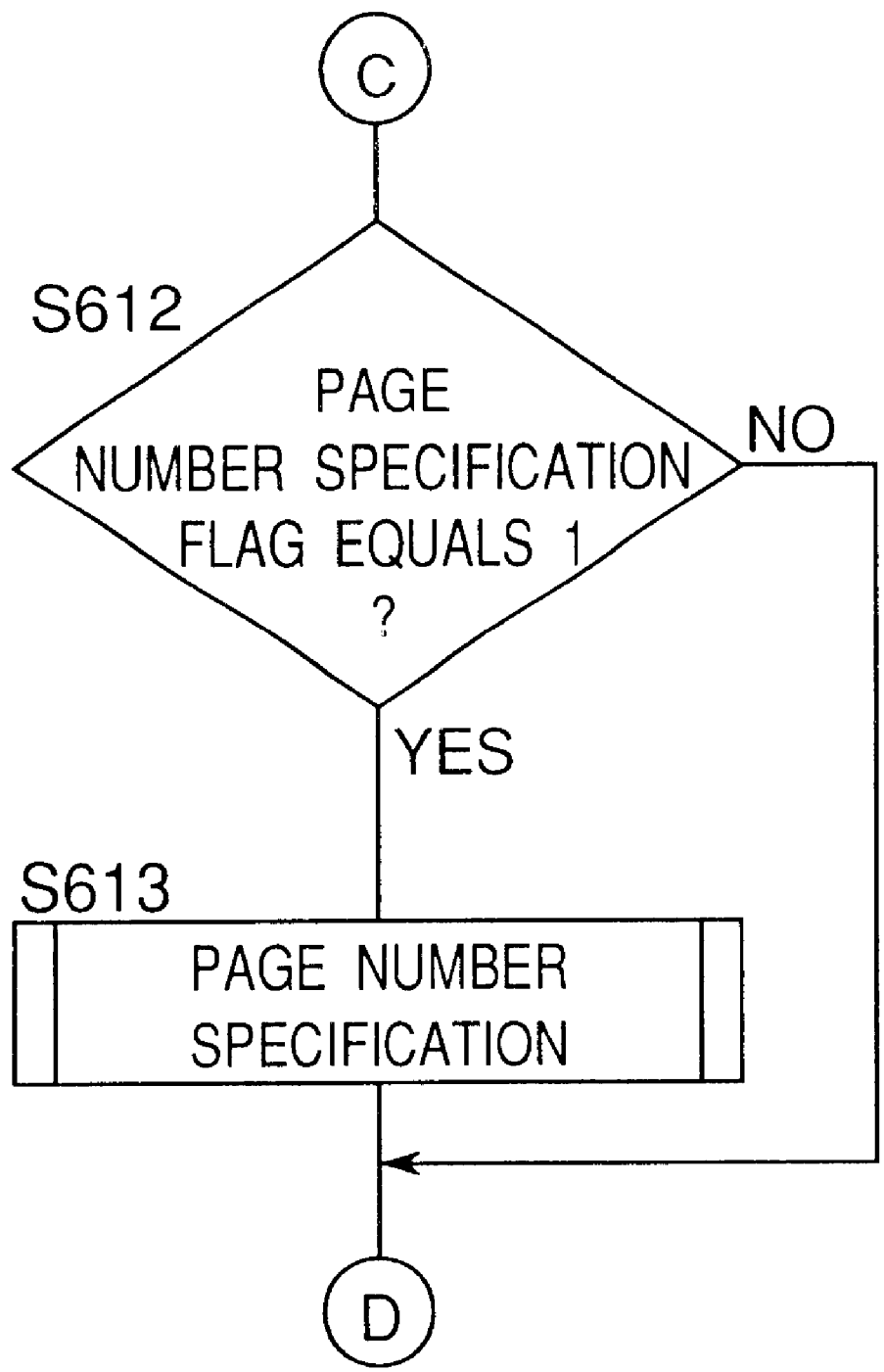
FIG. 14 shows of a second section of the detailed flow of saddle stitching mode setting shown in S527 of FIG. 12.
Figure 17:
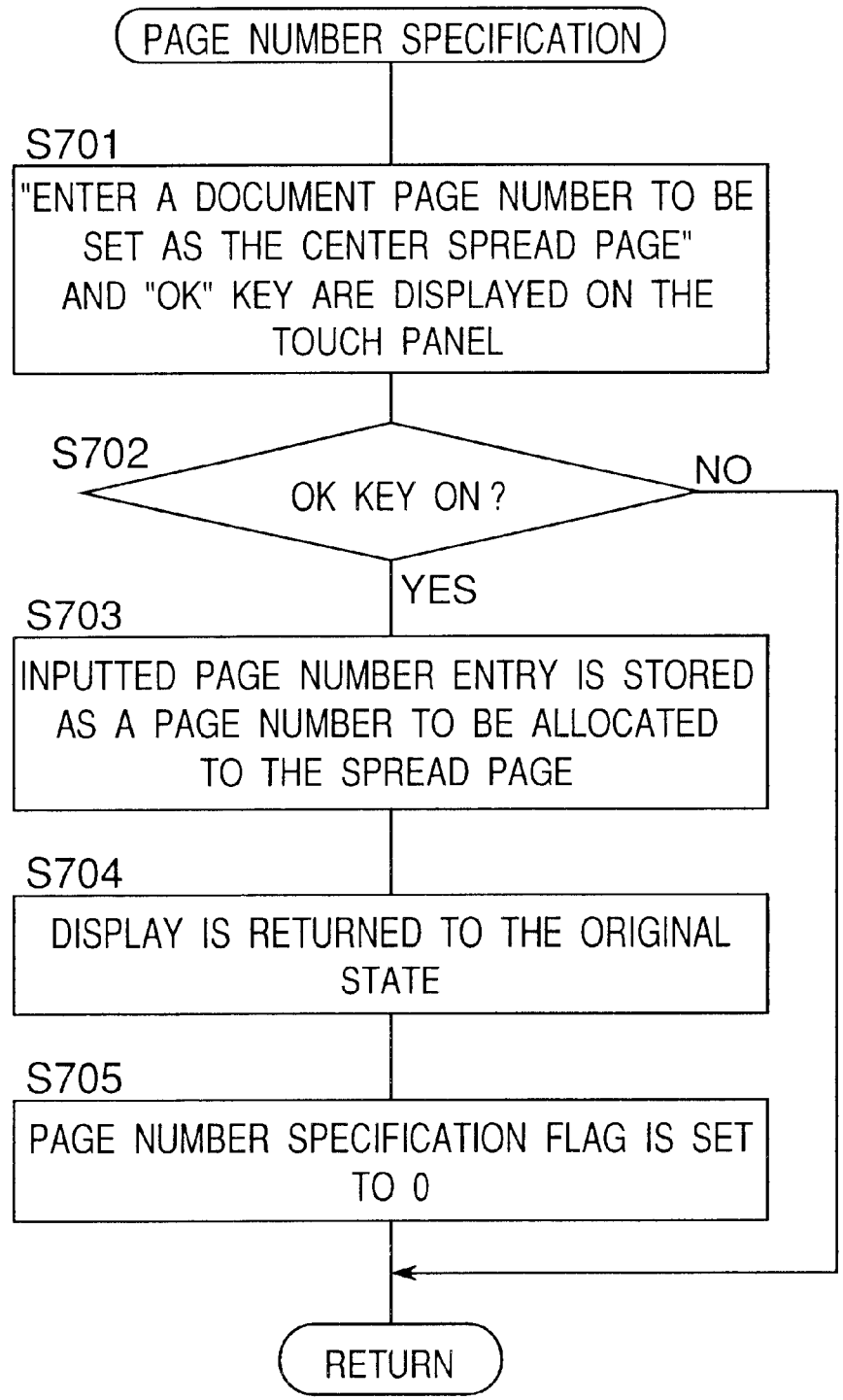
FIG. 17 shows a detailed flow of page number specification shown in S613 of FIG. 14.

As shown in FIG. 14, if the page number specification flag is set to "1" (S612), a page number specification routine is executed (S613). In the page number specification routine as shown in FIG. 17, a character string of "Enter a document page number to be set as the center spread page" and "OK" key for operator's confirmation of an inputted page number are displayed on the touch panel 401 of the operation panel OP (S701). When an operator inputs a page number and presses the "OK" key (S702), the inputted page number is stored in the RAM 121 as a page number to be allotted to the spread page (S703). Panel display then returns to the original state (S704), and the page number specification flag is turned to "0" (S705).

Figure 15:
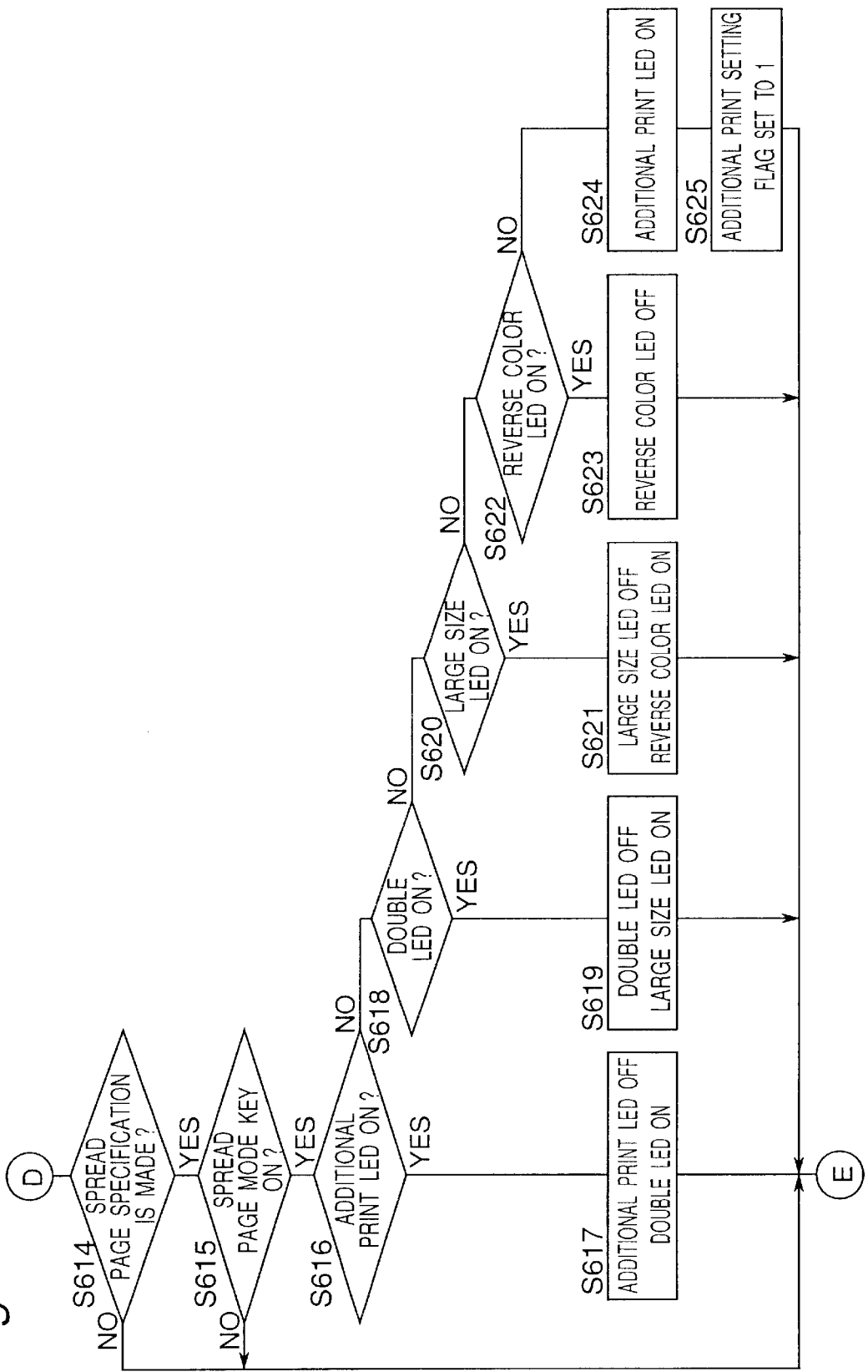
FIG. 15 shows a third section of the detailed flow of saddle stitching mode setting shown in S527 of FIG. 12.

The print mode of the spread page is then specified as shown in FIG. 15. Corresponding to LEDs 451 to 454 in vicinity of the spread page mode key 450 shown in FIG. 4, four print modes are available, respectively. The first mode is a spread sheet "additional print" mode, which is to print a predetermined additional image together with document images on a sheet of the spread page (hereinafter referred to as a ("spread sheet") The second mode is a spread sheet "double magnification (×2.0)" print mode, which is to set a print magnification ratio of the spread sheet to ×2.0 and the other sheets to ×1.0. The third mode is a spread sheet "large size" mode, which is to specify a paper size for the spread sheet that is larger than the other sheets. The forth mode is a spread sheet "reverse color" mode, which is to print the spread sheet using a color reverse to colors of the other paper sheets (for example, the spread page is printed in red and the remaining pages in black). The spread page mode key 450 is effective only when one of these four modes is selected.

Referring to FIG. 15, it is first determined whether the spread page specification is made or not, that is, whether any one of the above-described four modes is selected or not (S614). If the spread page specification is not made, the procedure returns to the first step.

On the other hand, if the spread page mode key 450 is turned on while any one of the above-described four modes is specified (S615), it is first determined whether the LED 451 is turned on or not, that is, whether the spread sheet additional print mode is currently specified or not (S616). If the spread sheet additional print mode is specified, the LED 451 is turned off and the spread sheet double magnification print mode is specified together with which the LED 452 is turned on (S617) If the spread sheet additional print mode is not specified in the step S616, it is then determined whether the LED 452 is turned on or not, that is, whether the spread sheet double magnification print mode is currently specified or not (S618) If the spread sheet double magnification print mode is specified, the LED 452 is turned off and the spread sheet large size mode is specified together with which the corresponding LED 453 is turned on (S619) If the spread sheet double magnification print mode is not specified in the step S618, it is then determined whether the LED 453 is turned on or not, that is, whether the spread sheet large size mode is currently specified or not (S620) If the spread sheet large size mode is specified, the LED 453 is turned off and the spread sheet reverse color mode is specified together with which the corresponding LED 454 is turned on (S621). If the spread sheet large size mode is not specified in the step S620, it is then determined whether the LED 454 is turned on or not, that is, whether the spread sheet reverse color mode is currently specified or not (S622). If the spread sheet reverse color mode is specified, the LED 454 is turned off and the spread page print mode specification is canceled (S623). If the spread sheet reverse color mode is not specified in the step S622, the spread sheet additional print mode is specified together with which the corresponding LED 451 is turned on (S624), and an additional print setting flag is set to "1" (S625).

Whenever the spread page mode key 450 is turned on, the procedures from S615 to S625 are executed. As a result, every time the spread page mode key 450 is turned on, the spread sheet additional print mode, the spread sheet double magnification print mode, the spread sheet large size mode, the spread sheet reverse color mode and cancellation of the spread page print mode specification are specified by turns.

Figure 16:
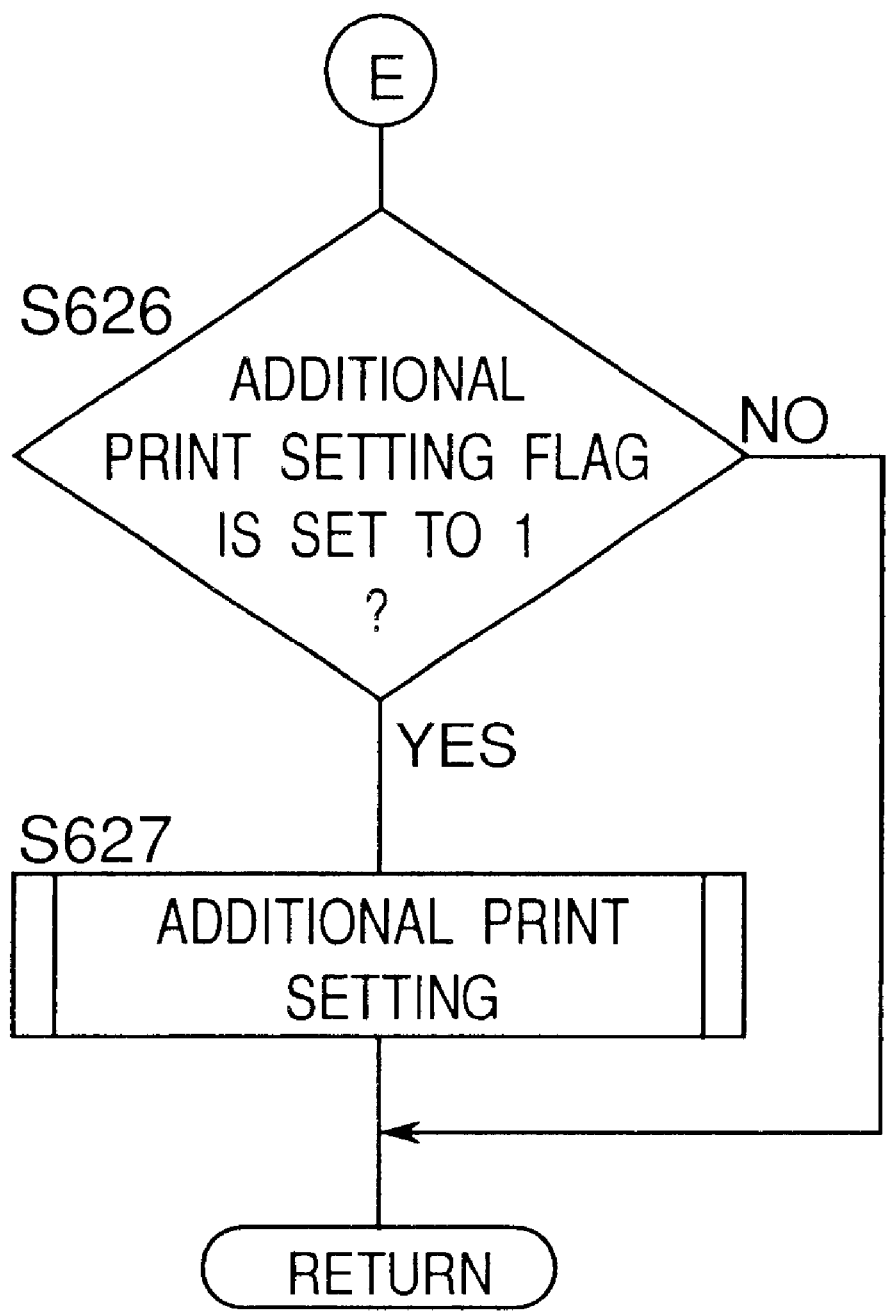
FIG. 16 shows a forth section of the detailed flow of saddle stitching mode setting shown in S527 of FIG. 12.
Figure 18:
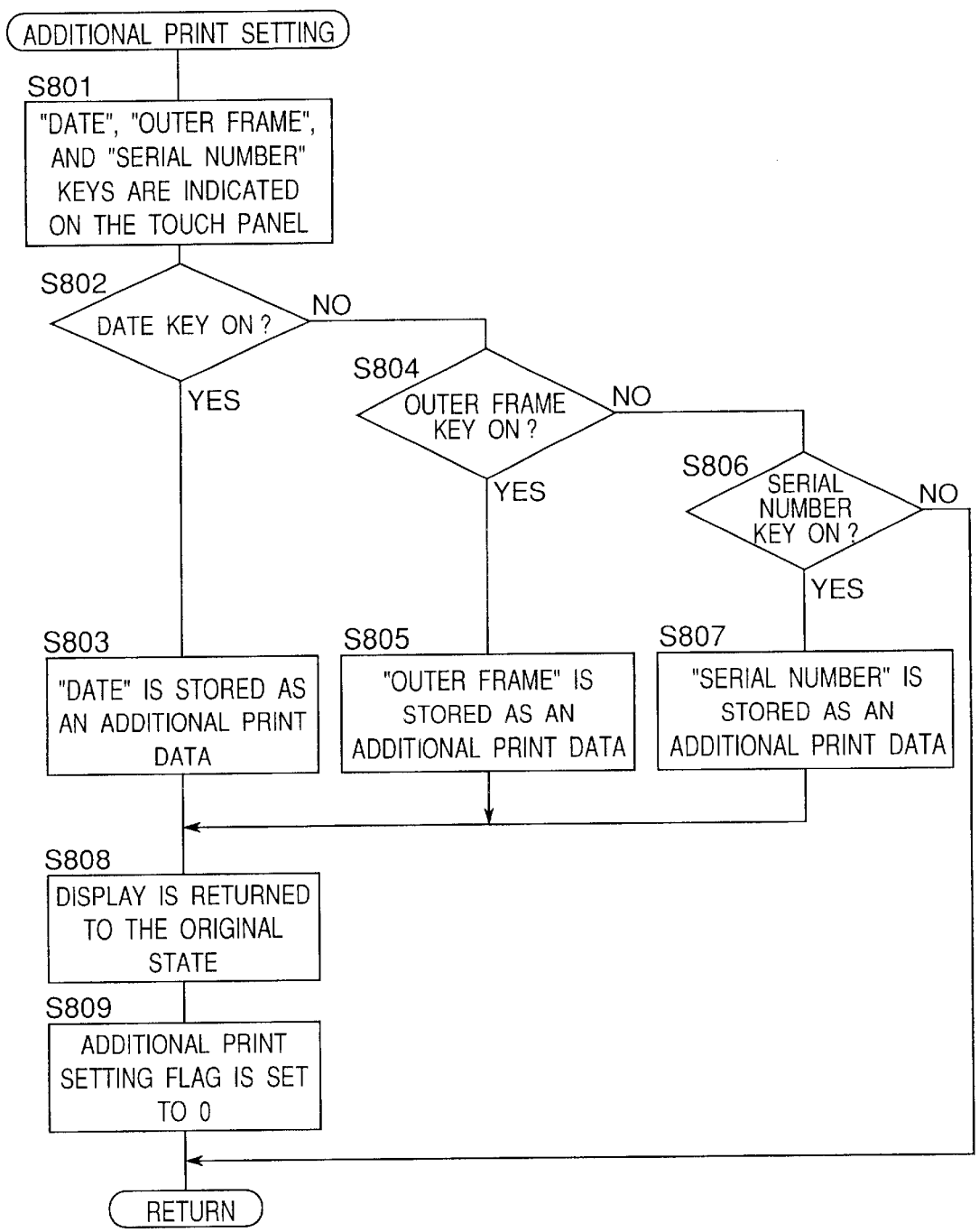
FIG. 18 shows a detailed flow of additional printing setting shown in S627 of FIG. 16.

As shown in FIG. 16, if the additional print setting flag is set to "1" (S626), an additional print setting routine is executed (S627). In the additional print setting routine shown in FIG. 18, keys of "Date", "Outer Frame" and "Serial Number" are displayed on the touch panel 401 on the operation panel OP (S801). If an operator turned on the "Date" key (S802), the current date is stored in the RAM 121 as an additional print data for the spread page (S803). If an operator turns on the "Outer Frame" key (S804), a specified outer frame is stored in the RAM 121 as an additional print data for the spread page (S805). If an operator turns on the "Serial Number" key (S806), a specified serial number is stored in the RAM 121 as an additional print data for the spread page (S807). The display on the touch panel then turns back to the original state (S808), and the additional print setting flag is reset to "0" (S809). If an operator turns on none of the above-mentioned keys, the procedure returns to the first step.

Figure 19:
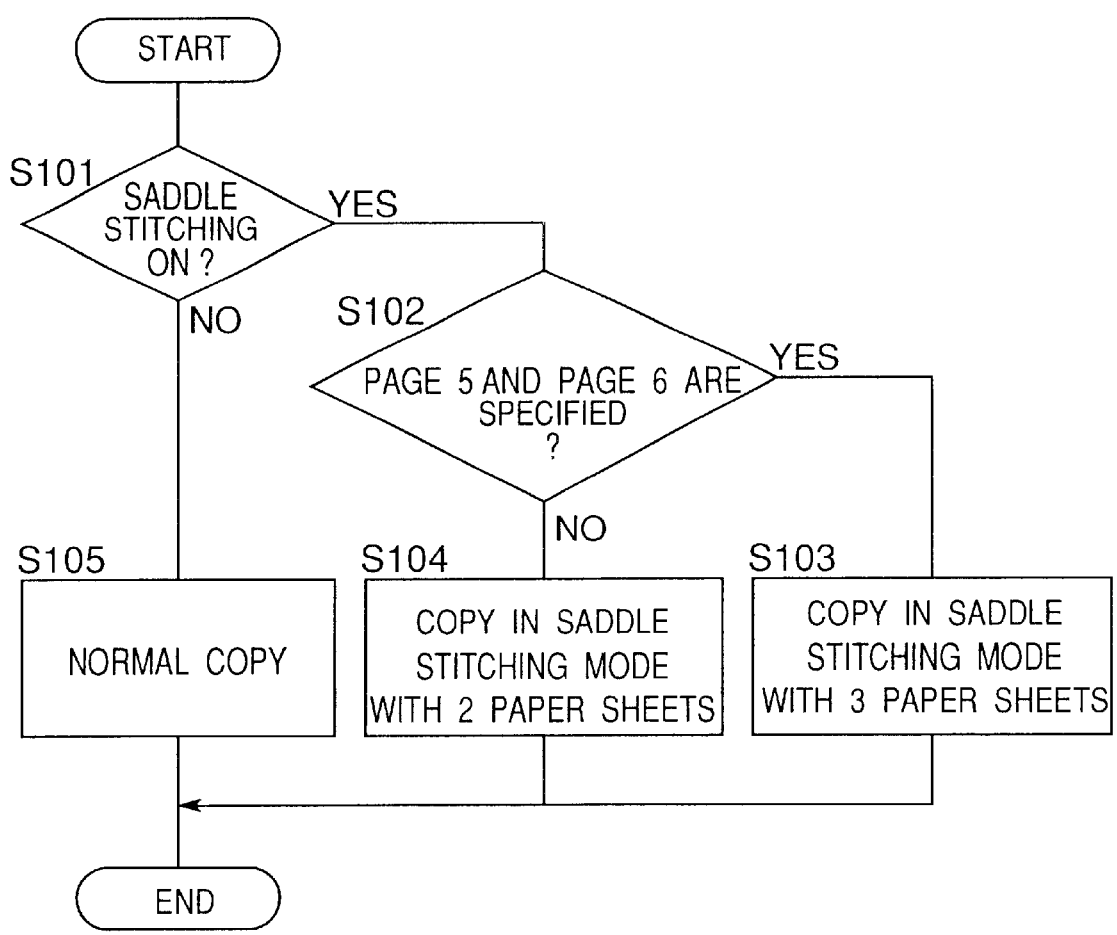
FIG. 19 shows a processing flow relating to specification of a spread page, executed by the copy machine when a saddle stitching mode is specified.
Figure 30:
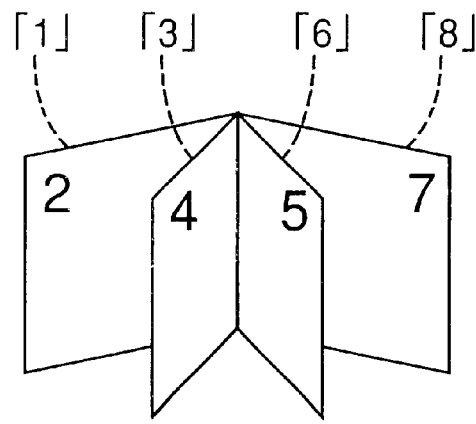
FIG. 30 shows saddle stitch type prints in which page 4 and page 5 from among 8 pages of documents are arranged on a spread page.

FIG. 19 indicates the outline of processing relating to the spread page specification executed by the copy machine 1 when the saddle stitching mode is specified. In this embodiment, it is assumed that a plurality of prints obtained by copying 8 pages of documents are stacked and then stitched at the center of the spread page. When the saddle stitching mode is specified (S101), it is first determined which image pages of documents should be allocated to the spread page. If pages 5 and 6 for example are specified through the operation panel (S102), printing is determined to be made to three paper sheets (S103). This is because three paper sheets are the minimum requirement for implementing saddle stitching with page 5 and page 6 being arranged on the spread page. If the page number of the documents to be arranged on the spread page is not specified, printing is determined to be made to two paper sheets (S104). As shown in FIG. 30, arrangement of a document of page 4 and page 5 on a spread page makes it possible to place all pages of 8 pages in two sheets of paper, thereby enabling implementation of normal saddle stitching. If the saddle stitching mode is not specified in the step S101, normal copy operation is performed in no saddle stitching mode (S105).

Figure 20:
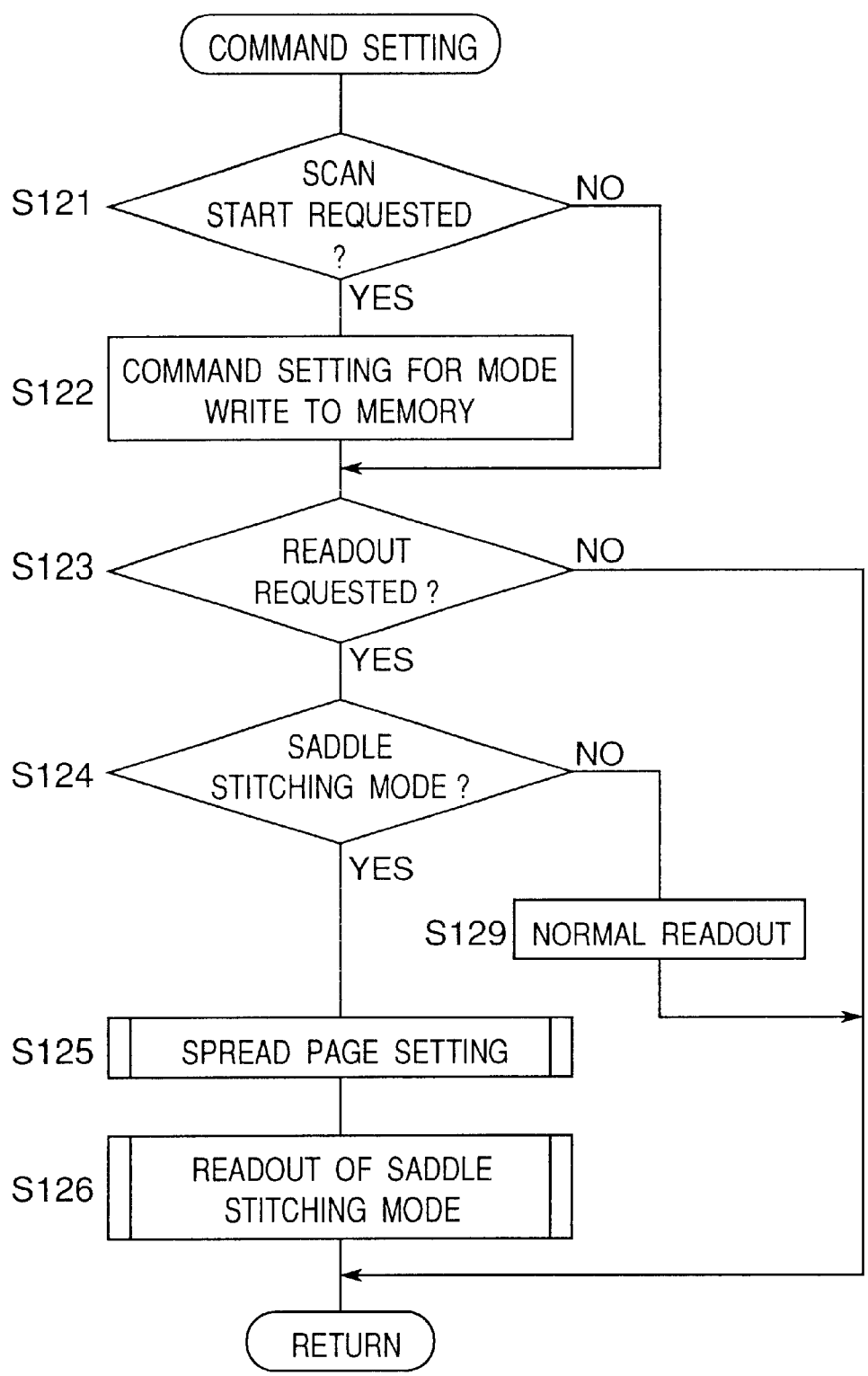
FIG. 20 shows a detailed flow of command setting processing shown in S65 of FIG. 8 when the processing flow shown in FIG. 19 is executed.
Figure 21:
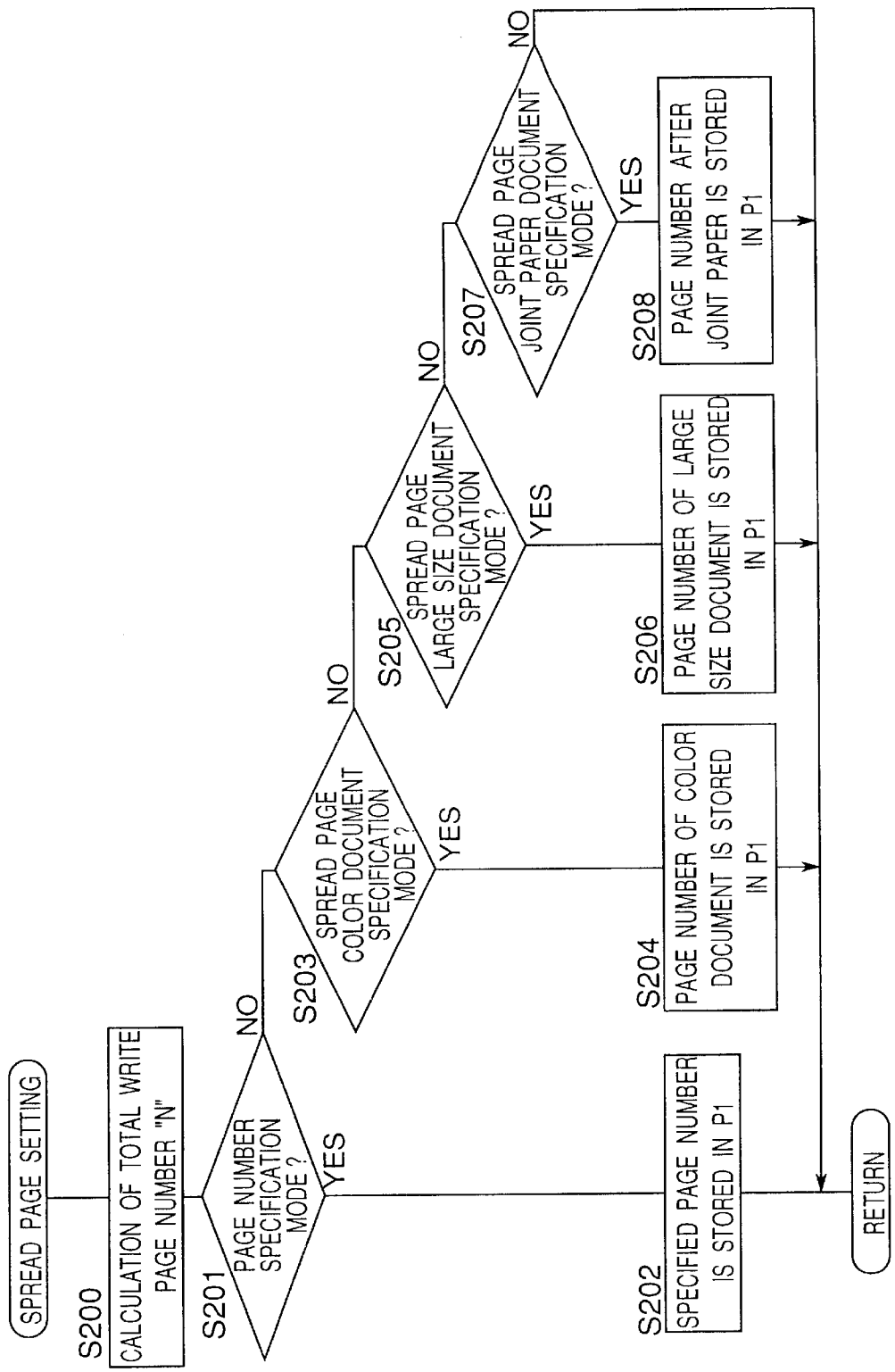
FIG. 21 shows a detailed flow of a spread page setting processing shown in S125 of FIG. 20.
Figure 22:
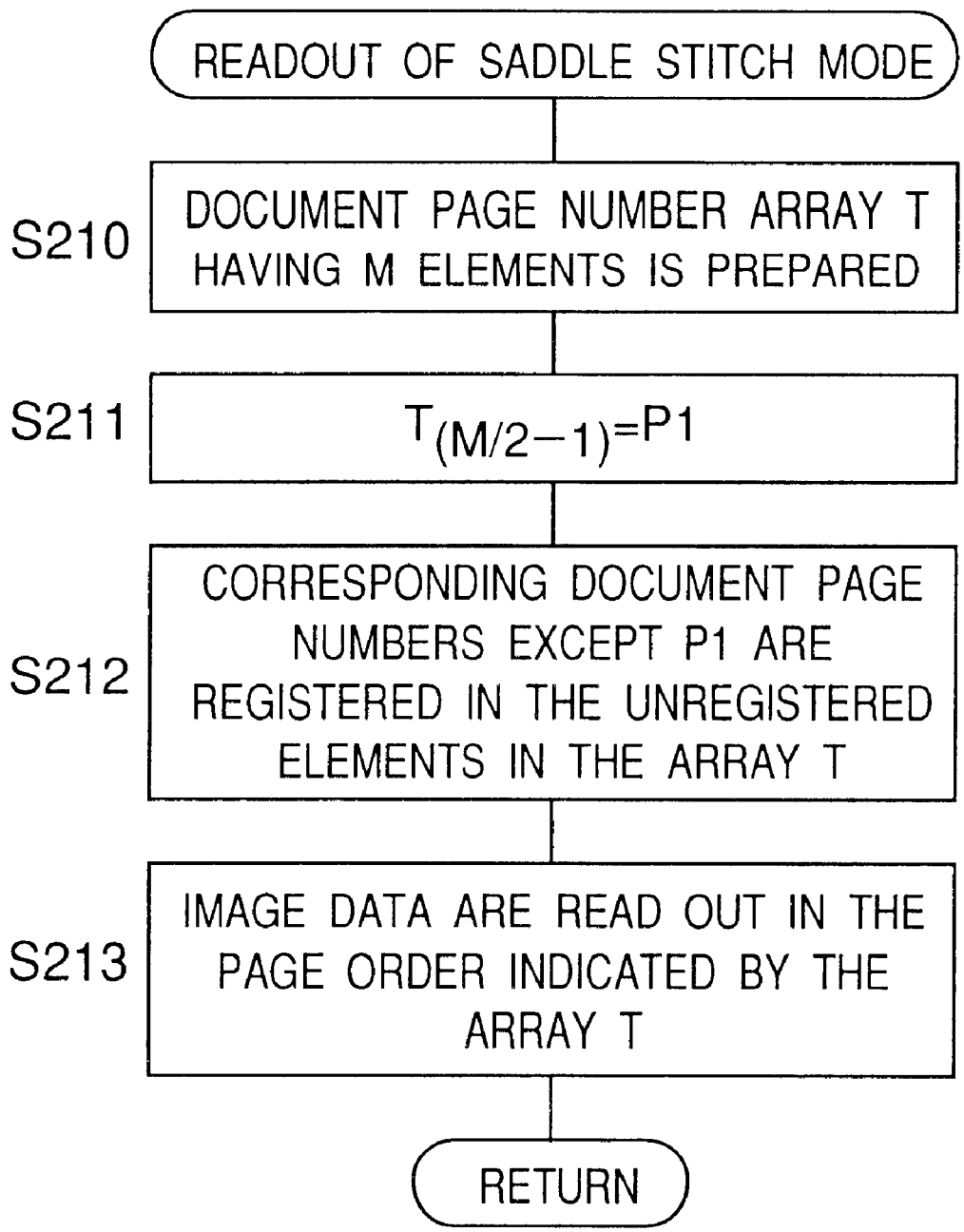
FIG. 22 shows a detailed flow of readout of saddle stitching mode shown in S126 of FIG. 20.

FIGS. 20 to 22 refer to detailed flows to execute the processing in FIG. 19.

As shown in FIG. 20, in the command setting (S65 in FIG. 8), it is first determined whether a scan start is requested or not (S121). If requested, a command necessary for controlling write access to the image memory is set in response to a specified copy mode (S122). Next, it is determined whether readout access from the image memory is requested or not (S123). If the readout access from the image memory is requested, it is determined whether the saddle stitching mode is specified or not (S124), that is, whether the LED 441 is turned on or not. If the saddle stitching mode is specified, the spread page setting processing to determine the page number of original images to be arranged on the spread page (S125), and readout of the saddle stitching mode are executed (S126). If the saddle stitching mode is not specified, normal readout access is carried out (S129).

The page order of image data read out from the image memory in the saddle stitching mode is different from the page order of image data read out from the image memory in the normal mode other than the saddle stitching mode. Image forming in the printer device PRT is performed per paper sheet. The saddle stitching mode, as shown in FIG. 30, requires a special page order which allocates page "2" and page "7" to one side of a first paper sheet, page "1" and page "8" to the other side of the first paper sheet, page "4" and page "5" to one side of a second paper sheet, and page "3" and page "6" to the other side of the second paper sheet.

As shown in FIG. 21, in the spread page setting (S125 in FIG. 20), total write page number "N" is firstly calculated based on the total page number of documents read by ADFR 500 (S200). Next, it is determined whether the page number specification mode is specified or not (S201), that is, whether the LED 461 is turned on or not. If the page number specification mode is specified, the page number stored in the step S703 is stored in a page number register P1 (S202). The page number register P1, which is incorporated in the RAM 126, is a register to store the page number of a document to be allocated to the spread page.

When the spread page color document specification mode is specified, that is, when the LED 462 is turned on ("YES" in S203), and if a certain document among a plurality of documents includes a color image except a monochrome image, the color image of the document is allocated to the spread page. For this procedure, it is determined whether each document includes a color image except a monochrome image. The page number of the document including color images except monochrome images is stored in the page number register P1 (S204).

When the spread page large size document specification mode is specified, that is, when the LED 463 is turned on ("YES" in S205), and if a plurality of documents include a document larger in paper size than the remaining documents, an image of the large size document is arranged on the spread page. For this procedure, a size of each document is determined based on the output from the document size sensor SE51, and the page number of the large size document is stored in the page number register P1 (S206). Consequently, when a plurality of documents include a page with a paper size different from that of the remaining pages, for example, when original image documents have plural A4 size pages and one A3 size page, the saddle stitch type print with the A3 size document image arranged on the spread page is obtained in easy operation with high reliability.

When the spread page join paper document specification mode is specified, that is, when the LED 464 is turned on ("YES" in S207), an image of the document immediately after the joint paper is arranged on the spread page. For this procedure, when a plurality of documents are read out, a size of each document is determined based on an output of the document size sensor SE51, and a sheet different in size from the first page of the documents is determined to be a joint paper. The page number of a document sheet following the sheet determined to be the joint paper is stored in the page number register P1 (S208). As a result, the saddle stitch type prints with an image of the document sheet immediately after the joint paper among a plurality of original image documents being arranged on the spread page are obtained in easy operation with high reliability.

As shown in FIG. 22, in readout of the saddle stitching mode (S126 in FIG. 20), an document page number array having M elements i.e. $T=\{T_m\}$ (m=0, 1, 2 . . . M−1) is prepared in the RAM 126 (S210) so as to indicate the page order of image data read out from the image memory. The element number "M" is set to a minimum required value (M=N or M>N) corresponding to the total write page number "N" and the page number stored in the page number register P1. In order to obtain the saddle stitch type prints described in FIG. 29 for example, when the total write page number is set to N=8 and the page number register is set to P1=5, at least 3 pages (total 12 pages with both sides) of elements are required. Therefore, the element number is set to M=12. In each element "$T_m$" of the original page number array "T", the page number of each document is planned to be stored (registered). As a result, an image data with the page number registered as the first element "$T_0$" to an image data with the page number registered as the last element "$T_{(M-1)}$" will be read out in sequence. Consequently, the image data to be allocated to the spread page are the image data with the page number stored in the element $T_{(M/2-1)}$ and the element $T_{(M/2)}$. Next, the page number stored in the page number register P1 is registered as the element $T_{(M/2-1)}$ (S211). Then, the corresponding page numbers of documents are stored as the remaining unregistered elements $T_0$ to $T_{(M/2-2)}$ and $T_{(M/2)}$ to $T_{(M-1)}$ (S212). The remaining elements are registered in sequence toward smaller number elements or toward larger number elements based on the element $T_{(M/2-1)}$ to which the page number is registered first. In this way, the page array is arranged so that an image of a document having a specified page number among documents is arranged on the spread page. After that, the image data with the page number registered as the element "$T_0$" to the image data with the page number registered as the element "$T_{(M-1)}$" are read out from the image memory in sequence (S213). Read image data is sequentially sent to the printer device PRT, where image forming is made against both side of the paper sheets. If the page number of a document corresponding to certain element $T_m$ is not present, the corresponding print is resulted to be a white paper.

The above procedure automatically creates the saddle stitch type prints in which an image document of a specified page number among a plurality of original image documents is arranged on the spread page. This allows an operator to obtain such prints in easy operation with high reliability.

Figure 23:
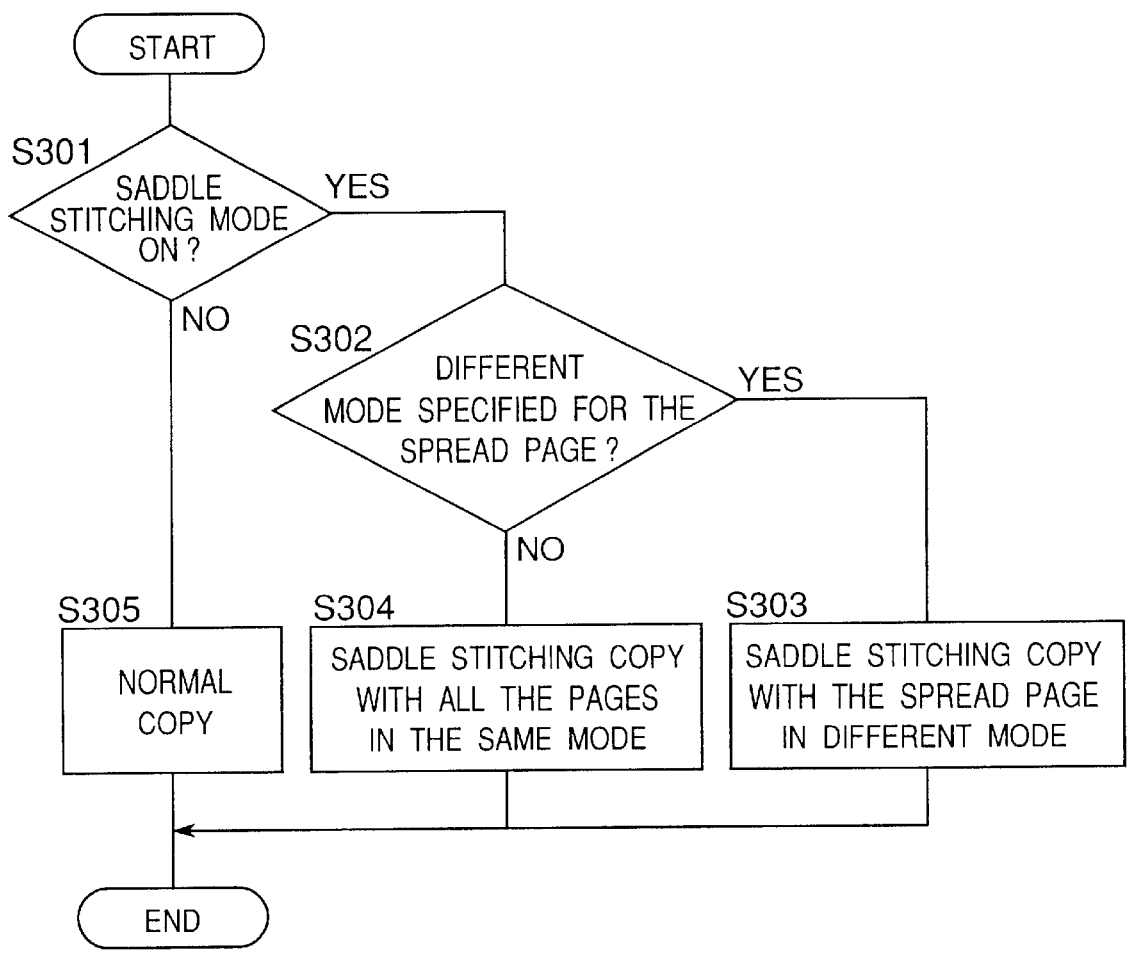
FIG. 23 shows a processing flow relating to a spread page copy mode, executed by the copy machine when the saddle stitching mode is specified.

FIG. 23 indicates outlined processing relating to a spread page copy mode executed by the copy machine 1 when the saddle stitching mode is specified. When saddle stitching mode is specified (S301), it is determined through the operation panel OP whether the mode specified for the spread page is different from that specified for the remaining pages (S302). If the mode specified for the spread page is different, the spread page is copied in a specified mode different from that of the other pages (still in the saddle stitching mode) (S303). This allows an operator to obtain the saddle stitch type prints with the spread page printed in the mode different from the remaining pages with high reliability in easy operation. If the mode specified for the spread page is not different from that for the remaining pages, all the pages are copied in the same saddle stitching mode (S304). If the saddle stitching mode is not specified in the step S301, normal copy not in the saddle stitching mode is carried out (S305).

FIGS. 24 to 27 indicate detailed flows for executing the processing shown in FIG. 23.

Figure 24:
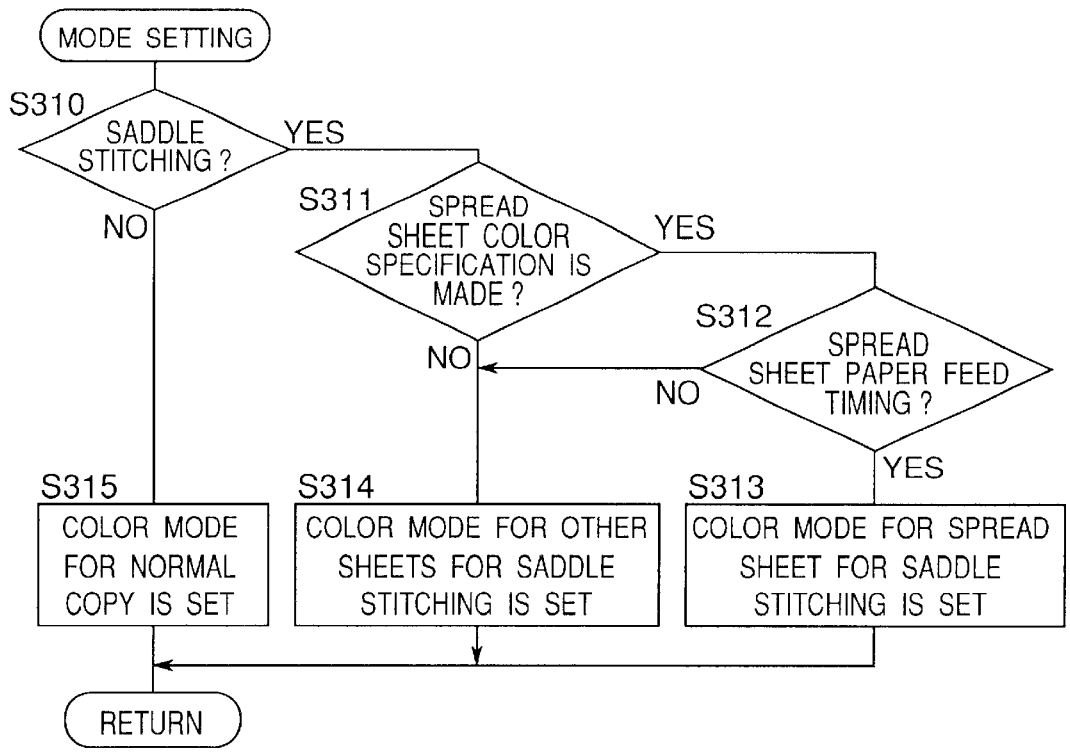
FIG. 24 shows a detailed flow of mode setting shown in S64 of FIG. 8 when the processing flow shown in FIG. 23 is executed.

For example in the mode setting processing (S64 in FIG. 8), execution of the flow shown in FIG. 24 makes it possible to specify a color mode for the spread page that is different from that for other pages. The term "color mode" is used herein in a comprehensive sense, i.e., to broadly refer to color relating modes in which images are formed not only with a plurality of colors such as full colors or multi-colors, but also with a single color such as a black color. Particularly, when the saddle stitching mode is specified (S310), it is determined through the operation panel OP whether the spread sheet color specification for specifying a color mode for the spread sheet that is different from that for the other paper sheets is made or not (S311). If such spread sheet color is specified, it is determined whether the spread sheet paper feed timing is asserted or not (S312). If it is asserted, the spread sheet color mode is set up (S313), and if it is not asserted, the color mode for other pages is set up (S314). For example, in the color mode for the spread sheet, image forming is conducted in full-color, while in the color mode for the remaining sheets, image forming is conducted in monochrome. This allows an operator to obtain the saddle stitch type prints with the spread sheet printed in the full color different from that for other sheets in easy operation with high reliability. When the spread sheet reverse color mode for printing the spread page in red and the remaining pages in black is specified, that is, when the LED 454 is turned on, an operator can obtain such saddle stitch type prints in easy operation with high reliability. If the spread sheet color mode is not specified in the step S311, the same color mode except the mode for the spread sheet is set for all the documents (still in the saddle stitching mode) (S314). If saddle stitching mode is not specified in the step S310, the color mode for normal copy not for the saddle stitching is specified (S315).

Figure 25:
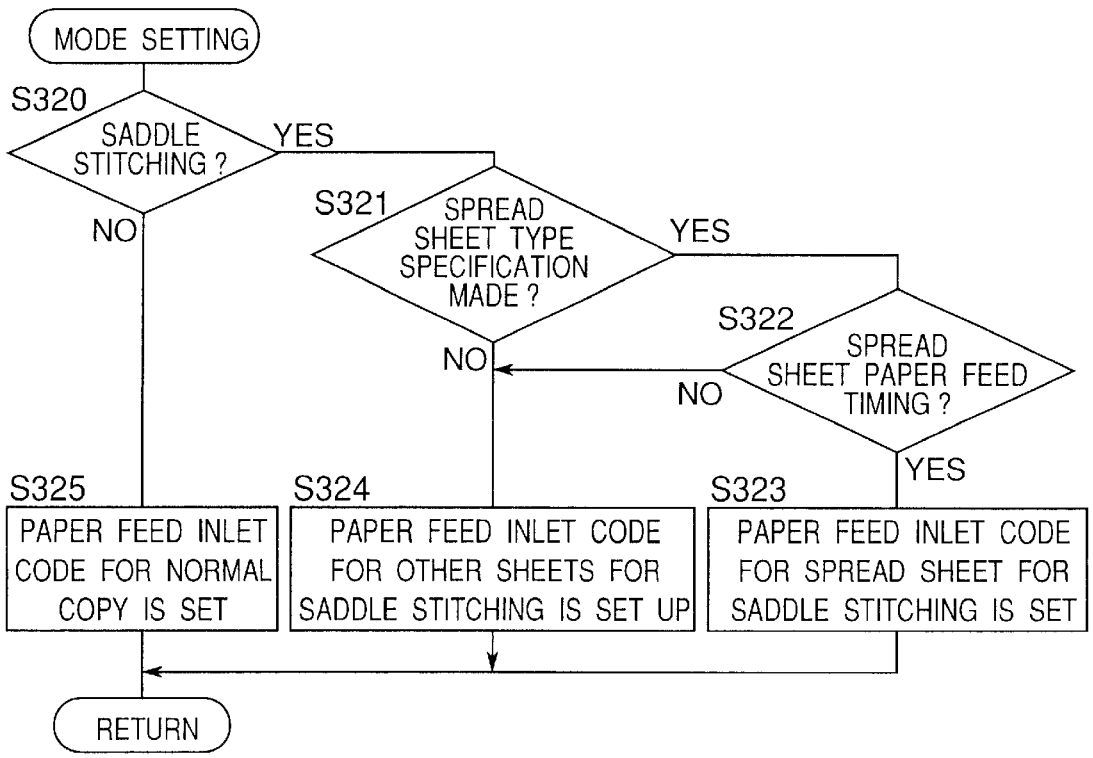
FIG. 25 shows another detailed flow of mode setting in S64 of FIG. 8 when the processing flow shown in FIG. 23 is executed.

In the mode setting processing (S64 in FIG. 8), execution of the flow shown in FIG. 25 makes it possible to specify the spread sheet different in type from the remaining paper sheets. Specifically, when saddle stitching mode is specified (S320), it is determined through the operation panel OP whether the sheet type specification for specifying the spread sheet different in type from the other paper sheets is made or not (S321). If a different sheet type is specified for the spread sheet, it is then determined whether the spread sheet paper feed timing is asserted or not (S322). If the spread sheet paper feed timing is asserted, a paper feed inlet code for the spread sheet is set (S323), and if the spread sheet paper feed timing is not asserted, a paper feed inlet code not for the spread sheets but for other sheets (still in the saddle stitching mode) is set (S324). For example, thick paper sheets may be fed from the paper feed inlet for the spread sheet and regular paper sheets may be fed from the paper feed inlet for other paper sheets. In this case, an operator can obtain the saddle stitch type prints with the spread sheet printed on thick paper sheets that are different from the paper sheets for the other pages in easy operation with high reliability. When the spread sheet large size mode is specified for specifying the spread sheet larger than other paper sheets, that is, when the LED 453 is turned on, an operator can obtain such saddle stitch type prints in easy operation with high reliability. If the spread sheet type is not specified in the step S321, the paper feed inlet code for other paper sheets than the spread sheet is specified for all the paper sheets (still in the saddle stitching mode) (S324). If the saddle stitching mode is not specified in the step S320, the color mode not for the saddle stitching mode but for normal copy operation is set (S325).

Figure 26:
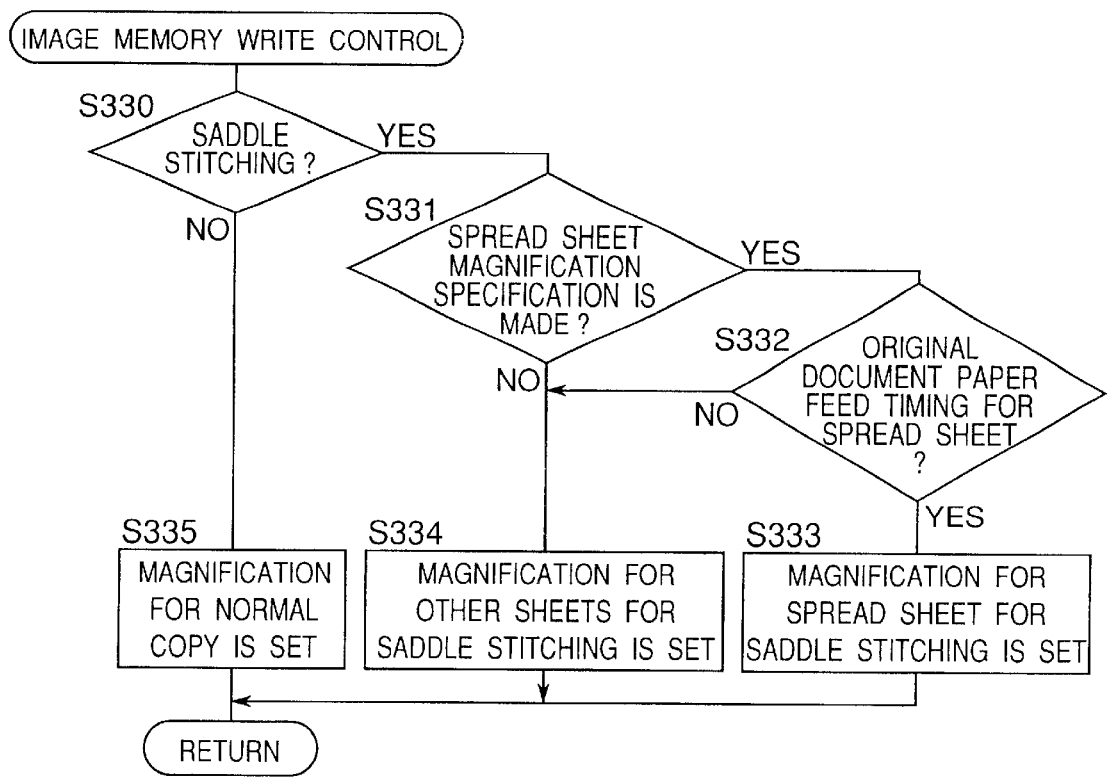
FIG. 26 shows a detailed flow of image memory write control shown in S74 of FIG. 9 when the processing flow shown in FIG. 23 is executed.

In the image memory write control processing (S74 in FIG. 9), execution of the flow shown in FIG. 26 makes it possible to specify the spread sheet different in copy magnification ratio from the remaining pages. Particularly, when saddle stitching mode is specified (S330), it is determined through the operation panel OP whether the spread sheet magnification specification is made or not for specifying the spread sheet different in a copy magnification ratio from the other paper sheets (S331), for example, whether previously mentioned spread sheet double magnification print mode is specified (the LED 452 is turned on) or not. If such spread sheet magnification specification is made, it is determined whether the documents paper feed timing for the spread sheet is asserted or not (S332). If the documents paper feed timing corresponding to the spread sheet is asserted, the magnification ratio for the spread sheet is set up (S333), and if the documents paper feed timing for the spread sheet is not asserted, the magnification ratio for other paper sheets than the spread sheet is set up (still in the saddle stitching mode) (S334). In the step of reading images of documents with the image reader IR, a magnification ratio of the spread sheet is set to, for example, ×2.0 and a magnification ratio of the other sheets is set to ×1.0. This allows an operator with high reliability in easy operation to obtain the saddle stitch type prints with an image of the spread sheet printed in the magnification ratio of ×2.0 that is different from that of the remaining paper sheets. If the spread sheet magnification specification is not made in the step S331, the same magnification ratio as that for other sheets is set for all the documents (still in the saddle stitching mode) (S334). If the saddle stitching mode is not specified in the step S330, the magnification ratio not for the saddle stitching mode but for the normal copy operation is set (S335).

Figure 27:
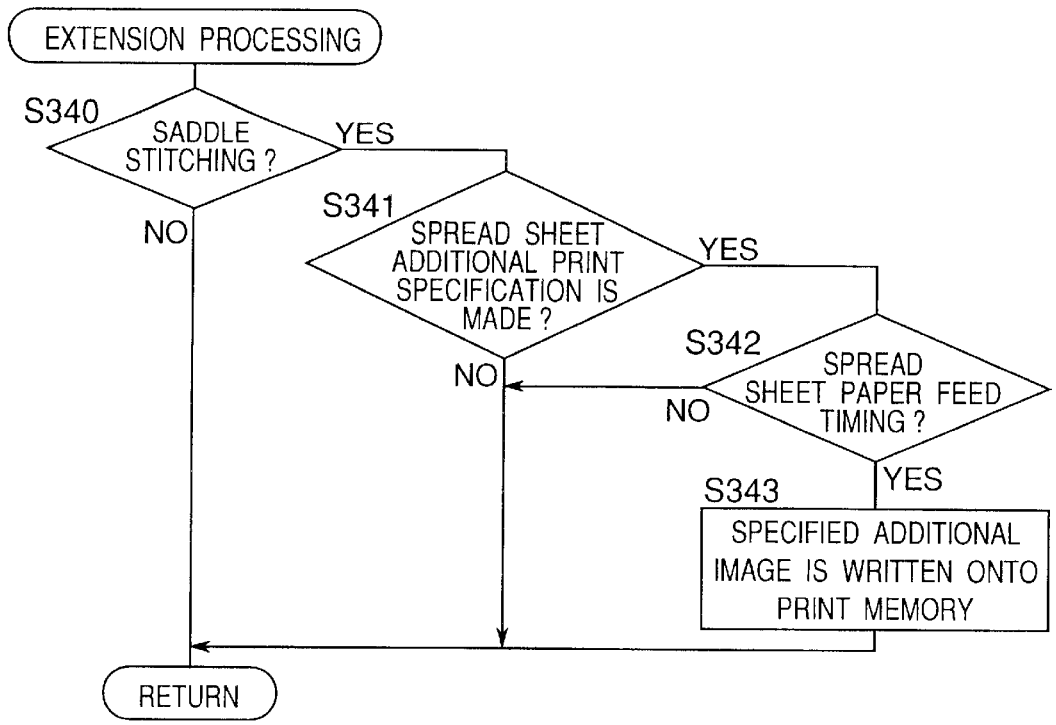
FIG. 27 shows a detailed flow of extension control shown in S76 of FIG. 9 when the processing flow shown in FIG. 23 is executed.

In the extension control processing (S76 in FIG. 9), execution of the flow shown in FIG. 27 makes it possible to set up an edit mode for carrying out additional print of the spread page. The term "additional print" herein refers to forming a predetermined additional image on a paper sheet together with an image of a document. The "additional image" includes a date and an outer fame. When the saddle stitching mode is specified (S340), it is determined through the operation panel OP whether the spread sheet additional print specification for executing additional print of the spread sheet is made (the LED 451 is turned on) or not (S341). If such spread sheet additional print is specified, it is determined whether the spread sheet paper feed timing is asserted (S342). If the spread sheet paper feed timing is asserted, a predetermined additional image is written onto a print memory (S343). If the spread sheet paper feed timing is not asserted, the procedure returns. This allows an operator to obtain the saddle stitch type prints with additional print arranged only on the spread sheet in easy operation with high reliability. If the spread sheet additional print specification is not made in the step S341 or the saddle stitching mode is not specified in the step S340, the procedure returns to the first step.

Figure 28:
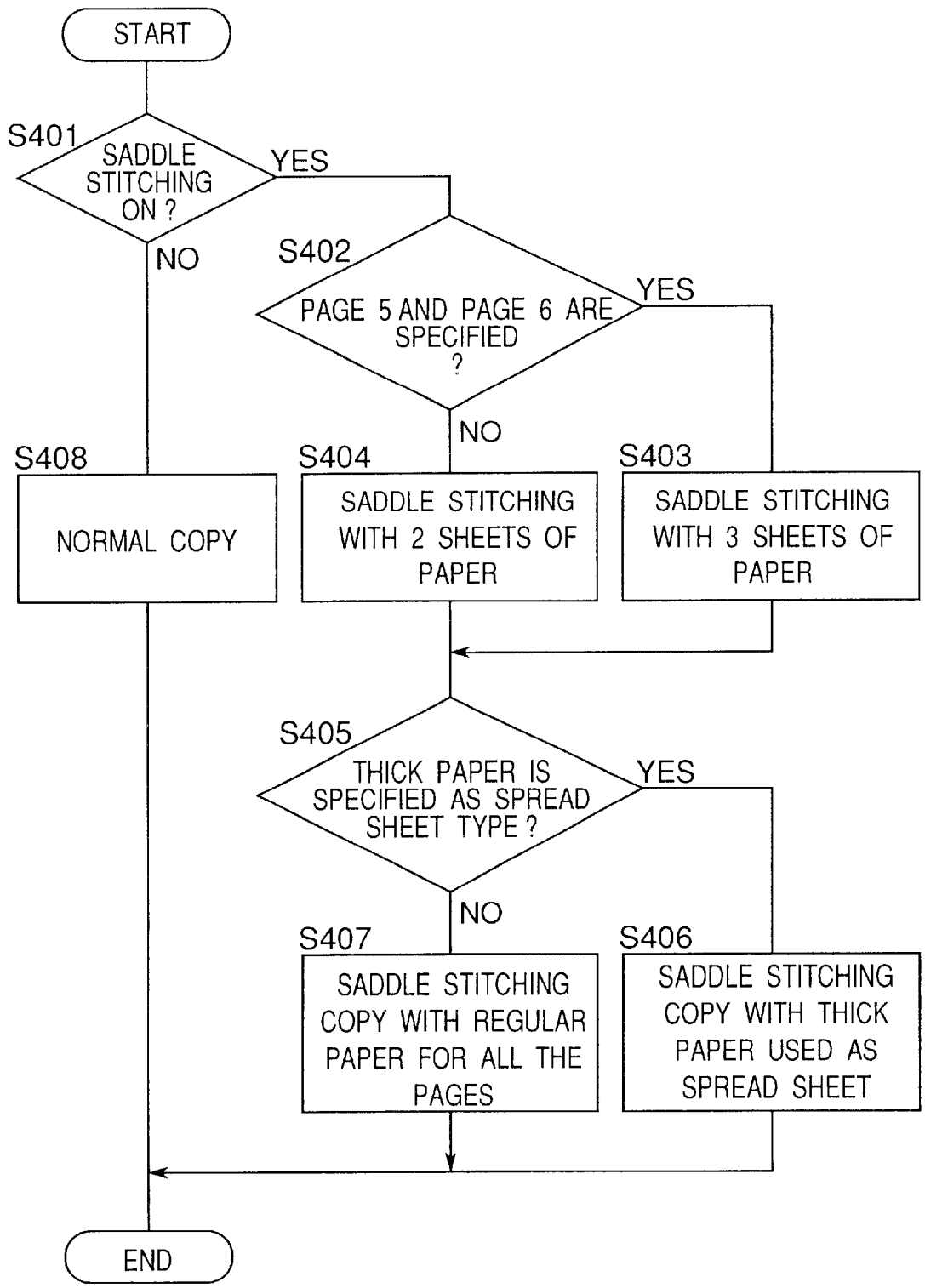
FIG. 28 shows a schematic view showing a comprehensive flow of processing relating to the spread page specification and the spread page copy mode, executed by the copy machine when the saddle stitching mode is specified.

FIG. 28 schematically indicates the processing executed by the copy machine 1 relating to the spread page specification and the spread page copy mode when the saddle stitching mode is specified. In this embodiment, it is assumed that prints obtained by copying 8 pages of documents are stacked and stitched at the center of the spread page.

Figure 29:
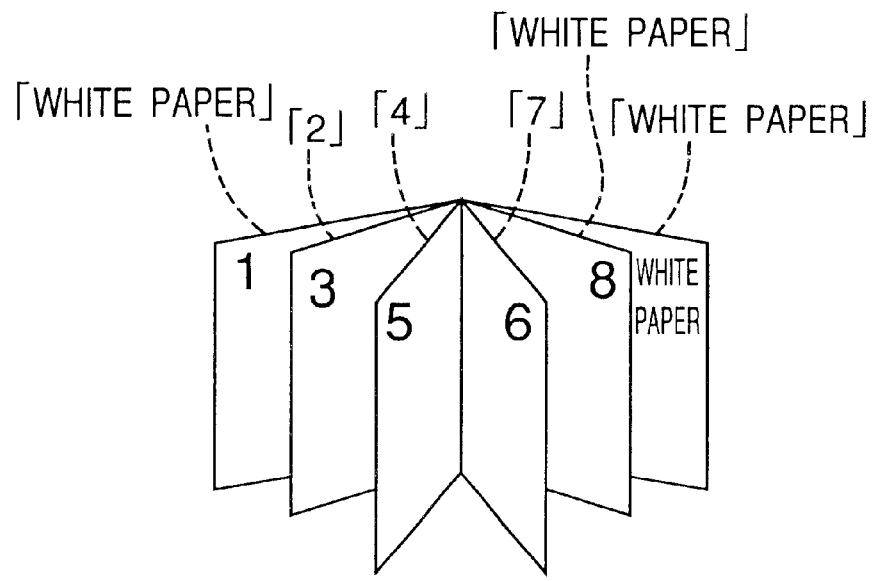
FIG. 29 shows a view showing saddle stitch type prints in which page 5 and page 6 from among 8 pages of documents are arranged on a spread page.

When the saddle stitching mode is specified (S401), the page numbers to be allocated to the spread page are determined. If for example 5th and 6th pages of the document are specified through operation panel (S402), printing is determined to be made to 3 sheets of paper (S403). This is because 3 sheets of paper are the minimum requirement in saddle-stitching documents where 5th and 6th pages are arranged on the spread page, as shown in FIG. 29. If page numbers to be arranged on the spread page are not specified, printing is determined to be made to 2 sheets of paper (S404). As shown in FIG. 30, arrangement of the 4th and 5th pages on the spread page makes it possible to place 8 pages in two sheets of paper, and thereby normal saddle stitching is implemented. Next, it is determined whether the spread sheet type specification for specifying thick paper as the spread sheet but not as the sheet of the remaining pages (S405) is made or not. If thick paper is specified as the spread sheet, a saddle stitching copy is carried out by using thick paper as the spread sheet and the other paper sheets as regular paper (S406). When there is no specification of sheet type, saddle stitching copy is carried out by setting all sheets as regular paper (S407). If the saddle stitching mode is not specified in the step S401, normal copy not in the saddle stitching mode is executed (S408).

In the above-described spread page join paper document specification mode, an image of a document immediately after the joint paper is allocated to the spread page. However, it will be understood that an image of the document sheet immediately before the joint paper may also be allocated to the spread page. Further, the joint paper may be distinguished from other documents by information other than color or size.

It will also be understood that specification relating to the spread page or various mode settings may be inputted not from the operation panel OP but from terminals such as a personal computer through network.

It will further be understood that the scanner section and the printer section may be independent entities. It is also possible to form an image data with a personal computer or the like, and transfer the same to the printer.

The "spread page" is formed as the middle sheet of stacked saddle stitch type prints in the embodiment of the present invention. However, the invention is not only limited to the embodiment disclosed but is easily applicable to the spread page located at a desired position in gathering of the saddle stitch type prints in another embodiment, which those skilled in the art will easily understand.

The invention being thus described, it will be obvious that the invention may be varied in many ways. Such variations are not be regarded as a departure from the spirit and scope of the invention, and all such modifications as would be obvious to one skilled in the art are intended to be included within the scope of the following claims.

What is claimed is:

1. A digital image forming apparatus, comprising:
   image input means for inputting image data of a plurality of documents;
   image signal storage means for storing the image data inputted by the image input means per page;
   image forming means for forming an image on a copy paper sheet based on the image data read out from the image signal storage means;
   a saddle stitching mode for transmitting the image data stored in the image signal storage means in sequence to the image forming means so that images are formed, corresponding to an inputted total page number of the documents, on copy paper sheets respectively in a page order indicated by a page array for saddle stitching of the copy paper sheets; and
   mode specification means for specifying a mode for a spread page different from a mode for the remaining pages.

2. A digital image forming apparatus as defined in claim 1, wherein
   the mode for the spread page specified by the mode specification means is a color mode different from a color mode for the remaining pages.

3. A digital image forming apparatus as defined in claim 1, wherein
   the mode for the spread page specified by the mode specification means is a sheet type mode different from a sheet type mode for the remaining pages.

4. A digital image forming apparatus, comprising:
   an image input for inputting image data of a plurality of documents;
   an image signal storage for storing the image data inputted by the image input per page;
   an image former for forming an image on a copy paper sheet based on the image data read out from the image signal storage;
   a saddle stitching mode for transmitting the image data stored in the image signal storage in sequence to the image former so that images are formed, corresponding to an inputted total page number of the documents, on copy paper sheets respectively in a page order indicated by a page array for saddle stitching of the copy paper sheets; and
   mode specification for specifying a mode for a spread page different from a mode for the remaining pages.

5. The digital image forming apparatus as defined in claim 4, wherein
   the mode for the spread page specified by the mode specification is a color mode different from a color mode for the remaining pages.

6. The digital image forming apparatus as defined in claim 4, wherein
   the mode for the spread page specified by the mode specification is a sheet type mode different from a sheet type mode for the remaining pages.

* * * * *